United States Patent
Buscemi et al.

(10) Patent No.: US 10,415,980 B1
(45) Date of Patent: Sep. 17, 2019

(54) METHODS AND APPARATUS FOR COMMUNICATING AND/OR STORING INFORMATION TO ENHANCE EXPERIENCES RELATING TO VISITS TO SITES SUCH AS THEME PARKS, ZOOS AND/OR OTHER PLACES OF INTEREST

(71) Applicant: CECELUMEN, LLC, Camarillo, CA (US)

(72) Inventors: James S. Buscemi, Camarillo, CA (US); Jim Webster, Manhattan Beach, CA (US); Justin Maestri, Los Angeles, CA (US)

(73) Assignee: CECELUMEN, LLC, Camarillo, CA (US)

( * ) Notice: Subject to any disclaimer, the term of this patent is extended or adjusted under 35 U.S.C. 154(b) by 0 days.

(21) Appl. No.: 15/592,193

(22) Filed: May 10, 2017

Related U.S. Application Data

(63) Continuation-in-part of application No. 15/344,477, filed on Nov. 4, 2016, and a continuation-in-part of application No. 15/062,175, filed on Mar. 6, 2016.

(60) Provisional application No. 62/251,678, filed on Nov. 5, 2015, provisional application No. 62/273,820, filed on Dec. 31, 2015.

(51) Int. Cl.
*G01C 21/00* (2006.01)
*G01C 21/20* (2006.01)

(52) U.S. Cl.
CPC ................... *G01C 21/206* (2013.01)

(58) Field of Classification Search
None
See application file for complete search history.

(56) References Cited

U.S. PATENT DOCUMENTS

| 2014/0171039 A1* | 6/2014 | Bjontegard | H04W 4/029 455/414.1 |
| 2015/0149250 A1* | 5/2015 | Fein | G07F 17/3234 705/7.31 |

* cited by examiner

*Primary Examiner* — John Olszewski
*Assistant Examiner* — Gerrad A Foster
(74) *Attorney, Agent, or Firm* — Straub & Straub; Michael P. Straub; Stephen T. Straub

(57) ABSTRACT

Methods and apparatus for communicating information to a visitor of a site, e.g., a theme park, historical site, zoo, etc., providing mementoes of the visit and/or communicating information encouraging future, e.g., repeat, visits are described. In various embodiments costumed characters, vending carts and/or other items of interest may move around a site and thus be at different locations at different times of the day. In some embodiments beacon transmitters are inserted in the costumes of the characters, on the vending carts and/or on other moveable items. Each beacon transmitter transmits a unique wireless signal.

10 Claims, 22 Drawing Sheets

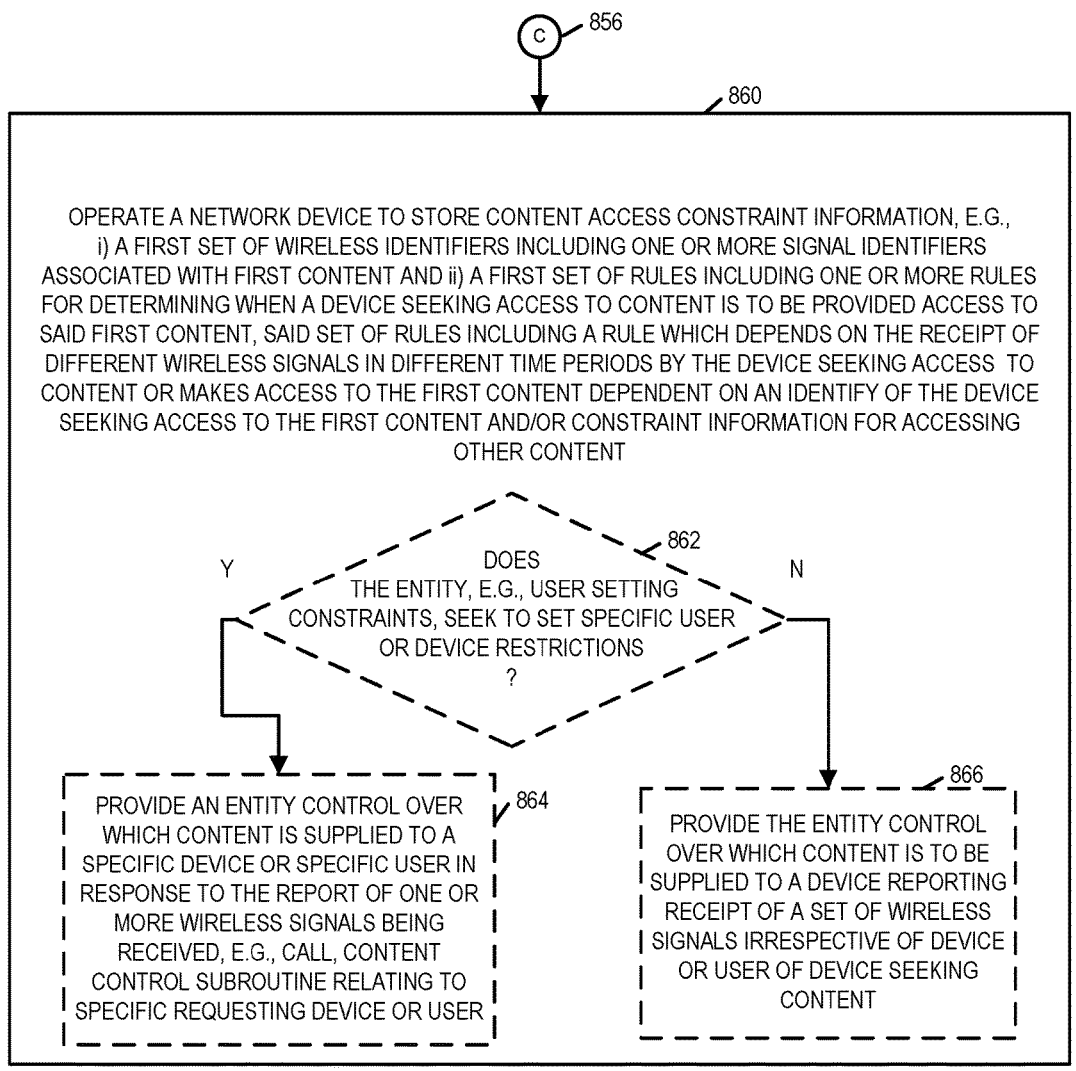
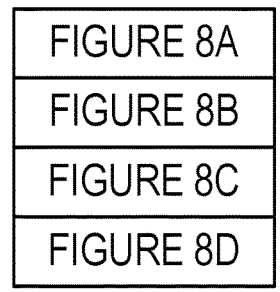
FIGURE 8D
FIGURE 8

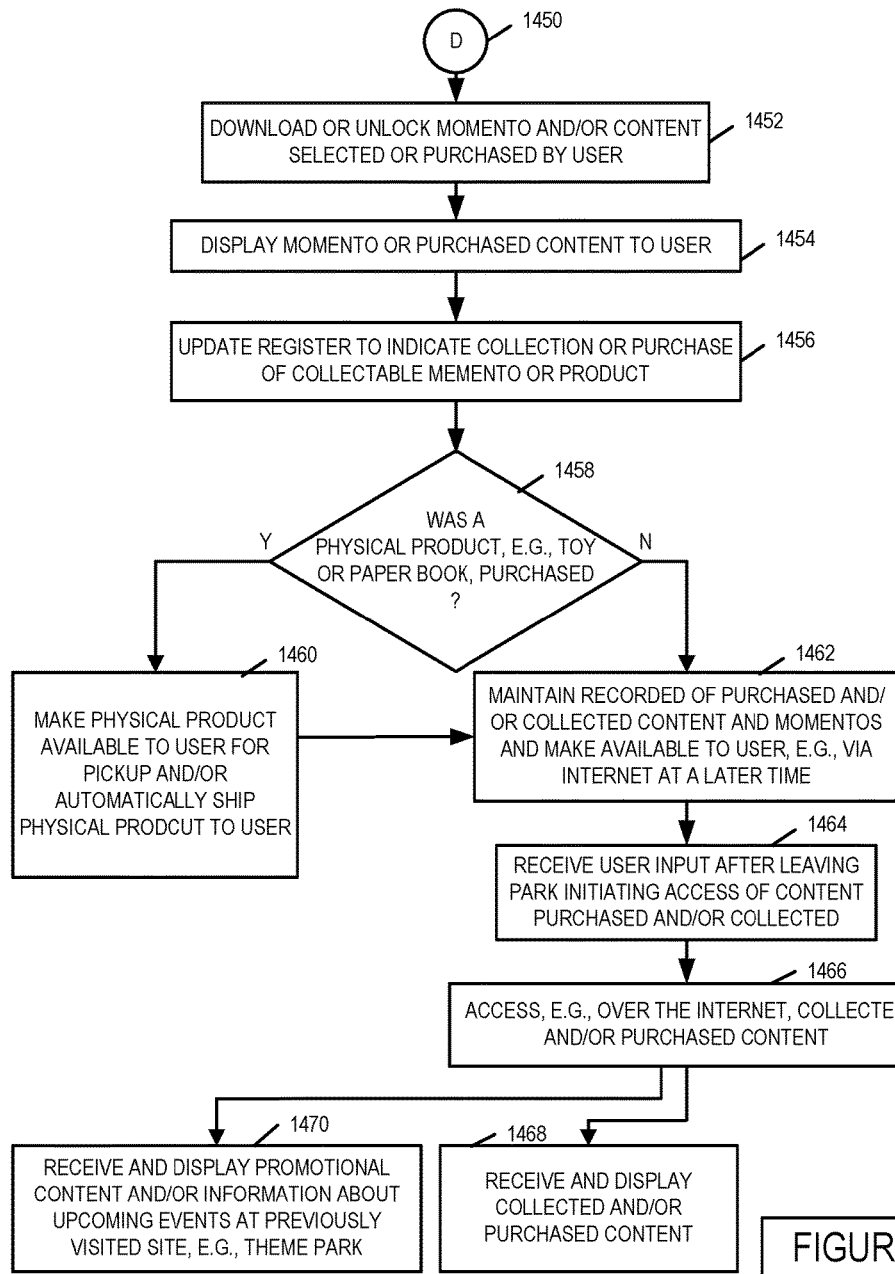

METHODS AND APPARATUS FOR COMMUNICATING AND/OR STORING INFORMATION TO ENHANCE EXPERIENCES RELATING TO VISITS TO SITES SUCH AS THEME PARKS, ZOOS AND/OR OTHER PLACES OF INTEREST

RELATED APPLICATIONS

The present application is a continuation-in-part of U.S. patent application Ser. No. 15/344,477 filed Nov. 4, 2016 which claims the benefit of U.S. Provisional Patent Application Ser. No. 62/251,678, filed on Nov. 5, 2015 and U.S. Provisional Patent Application Ser. No. 62/273,820, filed on Dec. 31, 2015 and is also a continuation-in-part of U.S. patent application Ser. No. 15/062,175 filed on Mar. 6, 2016, with each of the listed applications being hereby expressly incorporated by reference in their entirety.

FIELD

The present application relates to methods and/or apparatus for communicating information to a visitor of a site, e.g., a theme park, historical site, zoo, etc., providing mementoes of the visit and/or communicating information encouraging future, e.g., repeat visits.

BACKGROUND

In visiting sites such as theme parks, historical cites, zoos and/or other locations with attractions, shows, displays, rides and or other things of interest such as particular shows, the individuals visiting the site may have trouble locating the items of interest which may be spread out over an unfamiliar geographic area. Similar problems occur when an individual visits a site for an event such as a wedding, concert or even funeral.

Often small paper maps showing landmarks are handed out to visitors to facilitate their movement while at an event or site. However, visitors often find such maps difficult to use for a variety of reasons. One reason is that a visitor often has difficulty determining his/her location at the site on the map. Another problem is that particular things of interest may not be fixed to a particular location, e.g., because the thing of interest moves around at the site. Examples of things of interest that may move include costumed characters as well as moveable vending carts. For example, while rides, animal exhibits and/or theaters may be at fixed locations costumed characters may move throughout a theme park and/or vending carts may be positioned at different locations during different portions of the day based on expected foot traffic in an area.

It would be helpful if methods and/or apparatus could be developed which could be used to help visitors find things of particular interest, including locating moving things of interest such as costumed characters and/or navigate around a site being visited.

While locating things of interest at a site, some of which may move throughout a day, visitors also seek to obtain information about things of interest. It would be desirable if there were methods and/or apparatus which could help visitors locate and navigate to one or more items of interest at a site.

While finding a thing of interest while visiting a site presents one set of challenges, individuals often like to document a visit to a site such as a theme park or collect mementos of a visit. While in some cases the mementos are physical items such as a printed photo book or physical pins, in the current electronic age individuals are often happy to collect electronic mementos of a visit to a site such as a theme park, zoo and/or historical site. For example, visitors, especially children, visiting a theme park may seek to collect signatures of costumed characters they meet at theme park and/or photos of characters they encounter. Photos may be take with the costumed character and, optionally, sold to the visitor as a memento.

Unfortunately, not only may a visitor have trouble locating a costumed character at a theme park they may also have trouble getting close enough to get the costumed character's signature due to crowds, long lines or other reasons. Accordingly, a visitor to a park seeking to collect signed photos of various costumed characters may have difficulty obtaining one or more signed photos even though they may get close enough to see the costumed character. In addition, while a child might be willing to wait in a long line to get a signed photo of a costumed character, the parent and/or friends with the child might not be so willing to wait.

It would be desirable if a way of providing a signed photo or other memento of a character could be provided to a visitor in proximity to a customer character without requiring the visitor to wait in a long line and/or have physical contact with the visitor.

While providing information about the location of items of interest and providing of mementos can be important, it is also desirable to encourage repeat visits to a theme park or other site to encourage further exploration and/or use of the facilitates.

Accordingly, not only is it desirable to provide current information and mementos of a visit to a site such as a historical site or theme park it would also be desirable if methods and apparatus could be developed which would allow for the communication of information about future events at the site or which would encourage repeat visits to the site, e.g., months or years apart from an initial visit.

In view of the above, it should be appreciated that there is a need for methods and/or apparatus which could address one or more of the above discussed problems.

SUMMARY

Methods and apparatus for communicating information to a visitor of a site, e.g., a theme park, historical site, zoo, etc., providing mementoes of the visit and/or communicating information encouraging future, e.g., repeat, visits are described.

In various embodiments costumed characters, vending carts and/or other items of interest may move around a site and thus be at different locations at different times of the day. In some embodiments beacon transmitters are inserted in the costumes of the characters, on the vending carts and/or on other moveable items. Each beacon transmitter transmits a unique wireless signal sometimes referred to as a beacon ID. The beacon transmitters may be Bluetooth, WiFi or other types of transmitters such as, e.g., Eddystone and/or ibeacon transmitters. Depending on the type of beacon transmitter the range of the beacon signal maybe relatively small, e.g., a matter of up to 15 feet in the case of some Bluetooth transmitters or larger in the case of WiFi or other transmitters where the range may be, e.g., 10, 30 feet or more in some cases. The range of a beacon transmitter may be from 2 to 300 meters, depending on the beacon version. This equates to a range of approximately 7 to 984 feet depending on the beacon transmitter used. The transmitters transmit a unique signal, e.g., a beacon ID, allowing the transmitter, and thus the item and/or costumed character associated with the transmitter, to be identified.

In various embodiments in addition to placing beacon transmitters on movable items, beacon transmitters are positioned at a site at the location of fixed items of interest such as landmarks, particular displays, etc.

Visitors to a site often bring cell phones and/or other wireless devices with them which are capable of receiving, and also often transmitting, beacon signals. In various embodiments an executable application, e.g., sometimes referred to as an app, is loaded onto the visitors wireless devices, e.g., by downloading the application from an Internet site or app store. When executed the app detects wireless beacons, reports them back to a registry service along with information identifying the device which received the signal and when it was received. The registry service uses the reported beacon signals to retrieve information stored in a record associated with the received beacon ID that was reported. The decision as to what content is provided to the device reporting the receipt of the beacon signal is made based on the user's right to content as may be determined based on the purchase of a particular ticket to enter the site, e.g., theme park, the purchase of a particular package such as a signed picture book package and/or on other conditions such as proximity to a particular beacon transmitter from which a beacon signal was received which may be and sometimes is inferred from reported signal strength.

In the case of a funeral example the beacon is put on the deceased person, e.g., on the casket or urn in which the deceased person is located, and the beacon may travel with the person's remains from funeral hall to the grave. A user of a cell phone or other device that can detect the beacon can query the registry service with the beacon id and receive images, memorial testimony and/or other comments posted by the family or others to the registry service which stores and provides content in response to reports of a received beacon signal. Once at the grave the beacon can be used to facilitate locating of the grave. In addition the beacon can be used to give directions to the grave. Once at the grave when the phone detects the beacon on the grave the user can view and generate content that is associated with the person in the grave. The service would be sold to by the funeral halls and cemeteries.

For purposes of explaining the invention an example of the theme park visit will be discussed. However the methods and apparatus are applicable to a wide range of applications and site visits and are not to be limited to a theme park visit. In fact the methods and apparatus can be used for almost any kind of event from a zoo visit, a visit to a historical site, a visit to a wedding site and/or reception, a party site and even a cemetery or funeral site where beacon transmitters can be and sometimes are placed on one or more fixed or moveable items of interest. Thus the methods can be used for communicating information which may be location dependent and/or dependent on coming into the proximity of an item or person with a beacon transmitter. The methods and apparatus can be used for storing and/or providing information corresponding to an event or encounter and documenting the event or encounter in a way that a user can later retrieve images and/or information about the event or site visit, e.g., wedding photos, character photos, information about a deceased love one whose funeral was attended and/or cemetery site was visited. Time information can be stored with images or other content corresponding to a visit to a site or other event allowing the user not only to store or access visual mementoes, e.g., photos, but also be able to be reminded about when the visit occurred.

Returning to an example where an individual with a wireless device visiting a theme park, while visiting the site of the theme park the user's location can be determined from beacon signals that are reported as having been received by the user's wireless device and/or signals transmitted by the user's wireless device and received by one or more base stations, e.g., at known locations in the visited site.

Thus the location of a visitor can be determined based on received beacon signals, e.g., transmitted from beacon transmitters at known locations at the visited site, e.g., theme park, and/or the detection of signals transmitted by the visitors wireless signals by one or more access points or base stations in the back. Thus the visitor's location as the user moves through the site can be determined and tracked over time. In addition since the user's wireless device reports the receipt of beacon signals from beacon transmitters the user's proximity to a costumed character or characters carrying a beacon transmitter or a fixed beacon transmitter can be determined and appropriate actions take, e.g., content and/or items to which the user is entitled can be provided or made available to the user for pickup. Tracking of users or visitors using GPS is also supported with the user devices reporting their location information, as determined using a GPS receiver, to the registry server in some embodiments. GPS location reporting may be in addition to location determinations made based on reported beacon signals received by the user device and/or base stations at the visited site. In some embodiments a user can capture content, e.g. retrieve from a server or unlock previously stored content, associated with a costumed character when the user's mobile device detects the costumed character's beacon and the user initiates an action on the user's mobile device, e.g., selects an icon or entry corresponding to the detected character beacon, to capture the content corresponding to the costumed character. In some embodiments the content and/or items to be provided include images, e.g., sometimes referred to as pins, signed photos of characters such as Mickey or Minnie, and/or actual physical items such as a Mickey mouse doll or character book including signed photos of the characters encountered during the visit to the theme park. In some embodiments this also includes the unlocking of "exclusive" items that only would be available when you collect two or more character pins at one time, or even perhaps specific characters at a designated location. This may even be used to drive crowd flow, in the sense that visitors may rush to a certain area to obtain the pin to unlock the exclusive item or content. Thus by indicating the availability to capture special content corresponding to particular characters when they are together and indicating their location together on the electronic map displayed to the users. crowd flow and be directed in a subtle way that rewards the movement of individuals towards a particular location.

While in some embodiments a printed photo book is provided as the user leaves the park, in other embodiments the photo book memorializing the visit is made available in electronic form while the user, e.g., visitor is at the park or after the visitor leaves the park. Some of the content which can be included in the photo book or in the user's record maintained by the registry service by selecting it while in the presence of a particular character beacon signal can be of a collectable nature, e.g., a special limited edition photo, and only available for a limited time.

Since the location of the visitor can be determined from the beacon signals which are reported as being received or through other ways, a map of the site, e.g., theme park can be updated to indicate the user's location at any given time facilitating the user's navigation through the park. In a similar manner the location of costumed characters, vender carts and/or other moveable items with which a beacon transmitter is associated can be determined and the electronic map provided to the users device updated to reflect the positions of such characters and/or items. While the costumed character locations may be indicated on the map in some embodiments content and/or items corresponding to the costumed characters can only be retrieved or unlocked, e.g., collected, while within the beacon transmitter coverage area of the beacon on the costumed character. In this way visitors can easily find particular costumed characters even though the characters may wonder freely through the theme park without being limited to a particular scheduled location.

The method of the invention can, and sometimes are, also control the crowd flow if there are one or more of same costumed characters. By indicating a selected costumed character that is closest to the visitor or one that is in less crowded part of the park the invention could move the flow of people into a less crowded section of the park. In some embodiments when there are multiple characters with the same costume only one character of a particular type is shown to any given user with different user's being shown different locations for say a Mickey character when two such characters exist in the park. This approach allows multiple costumed characters to exist at the same time but avoids parents having to explain how there could be multiple "Mickey" characters at the same time with the young child being left to potentially wonder if they were going to see the real "Mickey". In some embodiments a recommendation function is also supported by the application on the UE with the function The function recommending the next costumed character for the visitor to go after next, e.g., based on proximity to the user and/or the crowd or wait time associated with meeting a character. The recommendation is based in some embodiments on what content was already captured and a visitor's indication of which content, e.g., character signatures, the visitor is desiring to capture. The invention on the mobile device would need to add the ability to capture the interest of the visitor.

Visitors can select, e.g., tap on an item or character displayed on the electronic map and a suggested route of travel indicated to the user with the user's progress along the map being shown as the user moves along the route. As the location of a movable target destination, e.g., current character location changes, the suggested route will be automatically updated as well as the indicated location of the user selected target destination.

While the methods and apparatus facilitate travel and finding of items of interest at a visited site, the user can also retrieve information and/or content about item associated with a beacon transmitter, and/or associate content captured by the user with the time for future retrieval. In this application a costumed character may be considered an "item" with which a beacon transmitter is associated. Thus costumed characters, like vending carts are to be considered "items" for purposes of discussing the invention.

In some embodiments when the user device, e.g., cell phone, comes into proximity of a beacon transmitter, receipt of the beacon is detected and information or content, e.g., an icon, associated with the beacon is displayed to the user. The icon may be, and sometimes is, supplied by the register service to which the receipt of a beacon signal is reported. The icon, including information and/or content might be an image, a set of words or a combination of an image and words associated with the detected beacon signal corresponding to a particular item. For example when a beacon carried by a Mickey mouse character is detected, the user's wireless device may show a gray or shaded Mickey mouse character which the user can select by tapping on a touch sensitive screen, e.g., of a cell phone on which the character is displayed. Selection of the icon corresponding to a beacon signal is reported to the register service and the user is allowed, depending on the ticket or plan purchased by the user, access to content and/or mementos related to the selected icon.

For example if a user device corresponding a basic admission ticket selects a Mickey icon displayed in response to detecting a "Mickey Mouse" character beacon signal the user may be provided, free of additional charge, with a small image, sometimes referred to as a "pin", of Mickey on their wireless device. The user may be, and sometimes is, also provided the opportunity to order additional "Mickey" merchandise or upgrade for a fee to a more substantial memento such as a signed photo of Mickey. The signed photo can be, and is, in some embodiments, customized with comments or wishes to the user and may include the user's name which can be obtained from a user record associated with the wireless device. If the user has purchased a memento book or purchased more than a basic subscription the user may be automatically provided with the signed photo in electronic form on their wireless device of the photo can be made available to the user in the form of a printed memento book which can be picked up on when leaving the theme park or mailed to the user.

The user record is updated to reflect entitlement to the image or images to which the user is entitled based on achieving proximity to the costumed character combined with the fact that a particular level ticket or product was purchased.

In this manner a visitor can collect images and/or signed photos of characters with which they come into proximity without having to wait in lines or make physical content with the costumed character.

Since the customer record is updated to reflect characters and/or items of interest that a customer encounters as they move through a theme park a sequential record of the characters they encounter can be stored and the photos of the characters presented in the order they are encountered in the customized electronic or printed memento book. In addition to providing images of characters, items of sites within the theme park visited by the user, a user can capture an image while at the park and associated it with a character, site and/or item by selecting the icon of the character, site or item and uploading a captured photo to the register server along with an indication of the associated icon and the identifier of the device or user uploading the image.

The register can incorporate the image or images captured by the user into the photo collection created by selecting icons of encountered characters. Thus not only can the user receive previously created images or photos of characters they encounter, but they can also associate there own images and/or photos of with a particular character, scene, or item. Thus a parent may snap a photo of a child with Mickey, upload it with an indication that it is to be associated with the Mickey icon and then be able to later access both the images of Mickey provided by the theme park along with their personal captured images which were captured while in proximity, of the Mickey character.

Different content may be provided when a user's device indicates it is in proximity to beacons corresponding to multiple different items than when in proximity to a single item. For example, a picture of Mickey and Minnie may be provided instead of two separate pictures when Mickey and Minnie character related beacons are both reported indicating that the two characters were in proximity to one another when the user selected the displayed Mickey and Minnie icons to show interest in the detected presence of both characters.

Using the described methods and apparatus a user can collect images and photos of the costumed characters as the user travels through the theme park, making the experience one of collecting mementos which can later be reviewed as part of a collection. e.g. in a printed book or by accessing the collection over the Internet. The images and/or collection can have content unique to a particular year or visit. In the event the user returns to the park during a later visit they can add to the previous collection and, in at least some embodiments, obtain new content corresponding to the time period of the second visit. During different years, different characters may be present at the park and/or different images provided so that the user can not only get a sense of the time frame they visited the park, but also be encouraged to revisit the park to collect new content.

In some embodiments, the mementos are accessible to the user from his wireless device or another device after leaving the park. The content can remain accessible for many years with, in some cases the user being provided with information about new attractions, promotional offers and/or reasons to revisit the park when the user accesses the content over the Internet.

Thus not only do the methods and apparatus facilitate an enjoyable experience at a park or other site visit, allow for the collection of mementos, but also they can be used to encourage and/or spark future visits days or years later as the user seeks to access the content collected electronically during a past visit.

Numerous additional features and embodiments are discussed in the detailed description which follows.

BRIEF DESCRIPTION OF THE FIGURES

FIG. 8D is a fourth part of the flow chart shown in FIG. 8A.

FIG. 8 shows have FIGS. 8A, 8B, 8C and 8D form a single flow chart.

FIG. 11 shows a subroutine that can be used for determining if a device that receives wireless signals and is seeking access to content should be provided access to content and/or what content the device should be provided access to.

FIG. 14D is a fourth part of a flowchart of an exemplary method of operating a user device in accordance with an exemplary embodiment.

FIG. 14 comprises the combination of FIG. 14A, FIG. 14B, FIG. 14C and FIG. 14D.

DETAILED DESCRIPTION

Methods and apparatus allow a wireless device, capable of detecting one or more signals transmitted by another device, e.g., a beacon transmitter, to detect a transmitted signal and report the receipt of the wireless signal or signals to a register device 106 which is responsible for providing access to content associated with wireless signals. Access to content maybe provided directly by the register device supplying content associated with the wireless signals reported as being received to the device reporting the signals and thereby seeking access to content, by providing a URL or IP address which can be used by the device which reported receipt of the signals to retrieve corresponding content or in a variety of other ways.

Figure 1:
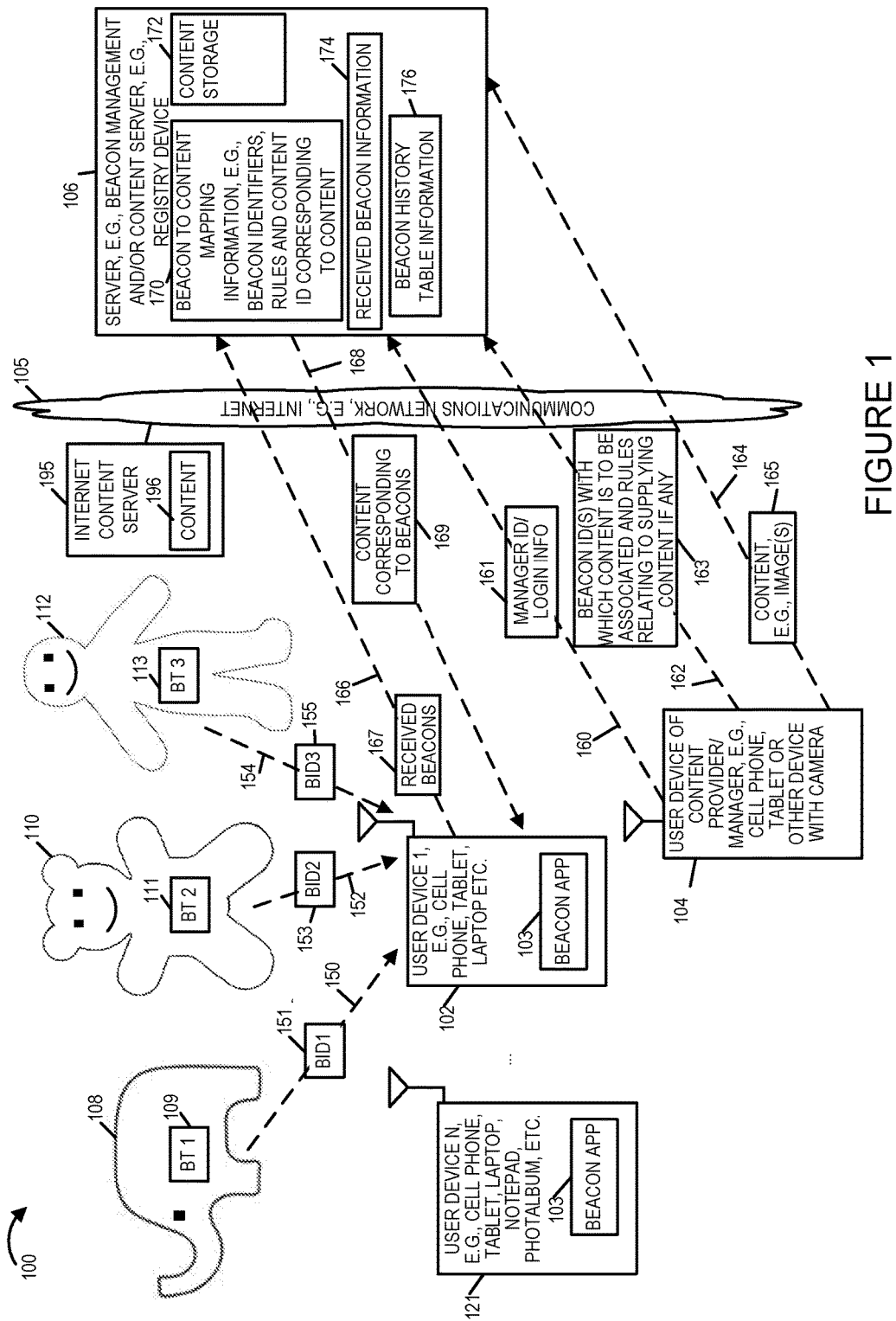
FIG. 1 illustrates an exemplary system including devices which are equipped with beacon transmitters, exemplary user devices, an exemplary user device of a content provider/manager, a communications network, and a server, e.g., a beacon management and/or content server, in accordance with an exemplary embodiment.

FIG. 1 illustrates an exemplary system 100 includes devices (108, 110, 112), e.g., stuffed animals, which are equipped with beacon transmitters (BT 1 109, BT 2 111, BT 3 113), respectively, exemplary user devices (device 1 102, e.g., a cell phone, tablet laptop, etc. including a beacon app 103, . . . device N 121, e.g., a cell phone, tablet laptop, etc. including a beacon app 103), an exemplary user device of a content provider/manager 104, e.g., a cell phone, tablet or other device with a tablet, a communications network 105, e.g., Internet, an Internet content server 195 including content 196, and a server 106, e.g., a beacon management and/or content server, e.g., a registry device. The devices (108, 110, 112) include battery powered beacon transmitters (109, 111, 113), which transmit beacon signals (150, 152, 154) communicating beacon IDs (BID1 151, BID2 153, BID3 155), respectively. The devices (108, 110, 112) are mobile and can be taken on trips and/or to play meetings. User devices which are content provider/manager devices, e.g., device 104, can detect the transmitted beacon signals (150, 152, 154) and can manage content, e.g., supply content to the content server to be supplied to devices reporting receipt of one or more of the beacon signals. Exemplary signal 160 communicates manager ID/Login information 161 from user device 104 to server 106 via communications network 105. Exemplary signal 162 communicates beacon information 163 including beacons ID(s) with which content is to be associated and rules relating to supplying content if any to server 106 via communications network 105. Exemplary signal 164 communicates content 165, e.g., images, corresponding to reported beacons from user device 104 to server 106 via network 105.

User devices, e.g., device 102, can be used to access content by reporting receipt of one or more beacon signals to the content sever 106 as part of seeking access to content. The devices receive in response, access to content determined by the rules and/or information stored in the content server that indicate what content should be supplied based on the reported received beacon signals and/or what content was previously supplied or what beacon signals were previously reported as being received. Providing access to content may involve the server providing the content or providing a URL, IP address or other information which can be used, by the device seeking access to content, to retrieve content. For example the device may receive a URL or IP address which can be used to access a web server which supplies the content to be accessed. Exemplary signal 166 communicates received beacon information 167, e.g., included received beacon IDs, to server 106, via network 105. Signal 168 communicates content 169 corresponding to the reported received beacon signals from server 106 to user device 102.

In various embodiments, at least one of the user devices in system 100, e.g., device 104, performs management functions with regard to beacon associated content, and some of the user devices in system 100, e.g., devices (user device 1 102, . . . , user device N 121) do not perform management functions with regard to beacon associated content.

Server 106, e.g., a beacon management and/or content server, includes beacon to content mapping information 170, e.g., beacon identifiers, rules, and content ID corresponding to content, content storage 172, received beacon information 174, and a beacon history table 176. Beacon to content mapping information 174 includes, e.g., information 162 and/or is based on information 162. Content storage 172 includes, e.g., content 165. Received beacon information 174 includes, e.g., information 167.

Figure 2:
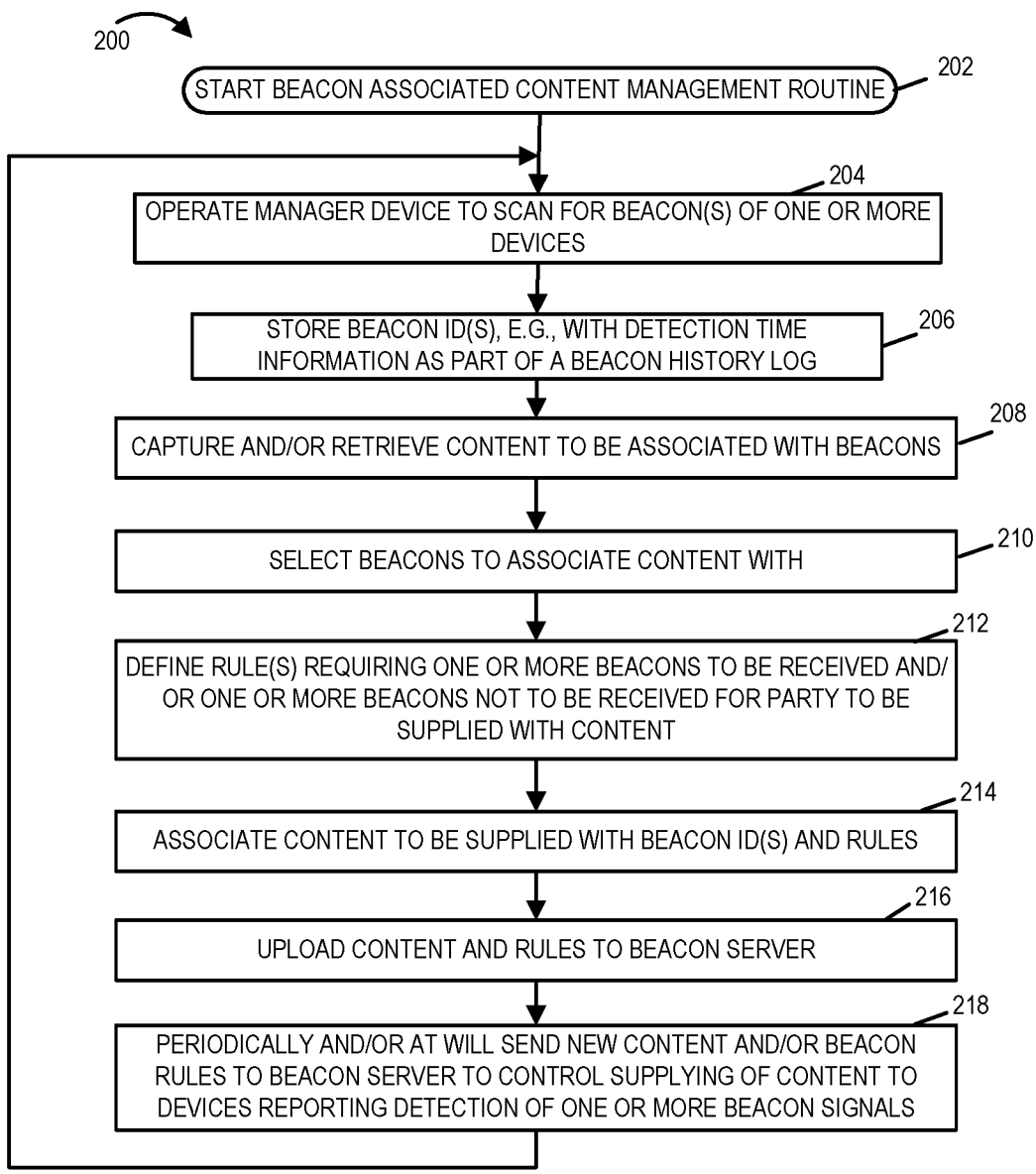
FIG. 2 is a flowchart of an exemplary method of operating a manager device, e.g., a user device of content provider/manager, in accordance with an exemplary embodiment.

FIG. 2 is a flowchart 200 of an exemplary method of operating a manager device, e.g., user device 104 of content provider/manager, in accordance with an exemplary embodiment. Operation starts in step 202 in which the manager device is powered on and initialized and a beacon associated content management routine is started. Operation proceeds from step 202 to step 204.

In step 204 the manager device is operated to scan for beacon(s) of one or more devices. The manager device may, and sometimes does, detect beacon(s) and recovers the information included in the beacon(s), e.g., including beacon ID information. Operation proceeds from step 204 to step 206.

In step 206, the manager device stores beacon ID(s), e.g., with detection time information as part of a beacon history log. Operation proceeds from step 206 to step 208.

In step 208 the manager device captures and/or retrieves content to be associated with beacons. Operation proceeds from step 208 to step 210. In step 210 the manger device selects beacons to associate content with. Operation proceeds from step 210 to step 212.

In step 212 the manager device defines rule(s) requiring one or more beacons to be received and/or one or more beacons not to be received for the party to be supplied with content. Operation proceeds from step 212 to step 214. In step 214 the manager device associates content to be supplied with beacon ID(s) and rules. Operation proceeds from step 214 to step 216. In step 216 the manger device uploads content and rules to a beacon server. Operation proceeds from step 216 to step 218. In step 218 the manager device periodically and/or at will sends new content and/or beacon rules to the beacon server to control supplying of content to devices reporting detection of one or more beacon signals.

In one embodiment, wireless transmitters, e.g., beacon transmitters, are embedded in stuffed animals, robots, toys or other devices such as devices 108, 110, 112. Beacon transmitters may be implemented as WiFi beacon transmitters, LTE compatible transmitter devices or in another form where the beacon transmitter transmits a signal communicating information, e.g., one or more beacon identifiers, which identify the beacon signal. Different beacon transmitters may, and in some embodiments do, transmit different beacon identifiers, e.g., Beacon IDs.

In various embodiments, a content provider can detect the beacon ID transmitted by a beacon transmitter in a toy, e.g., stuffed animal or other device. The content provider may be, and in some embodiments is, a person who buys the toy, e.g., stuffed animal to give to someone else. In other embodiments, the content provider may be the toy manufacturer, a promoter associated with a promotion in which the toy is given away or some other entity who wishes to provide content under some situations to some to who the toy including the beacon is given or will come into proximity to the toy, e.g., stuffed animal including the beacon signal.

In some embodiments the content provider after detecting the beacon signal sends an identifier to a server, e.g., a beacon management and/or content sever 106, identifying the beacon transmitted by the device with which content is to be associated. The content provider may, and sometimes does, also send content to be associated with the beacon to the beacon server 106. The content provider, e.g., owner of the device which transmits the beacon signal, can and sometimes does set up an account with the beacon server 106 and logs in using a secure password to manage the content associated with one or more beacon identifiers. The detection of the beacon identifier and communication of content to be associated with the beacon identifier can be done using a cell phone 102 and/or other device capable of detecting beacon signals and communicating with the content server 106. Images captured by a camera included in the cell phone of the content provider may, and sometimes does, provide content in the form of still images and/or video to be associated with the beacon identifier communicated to the server 106. In the case where the beacon identifier is known to the content provider because of information supplied with the beacon transmitter inserted into the device or toy such as a registration ID that is supplied by the owner to the server 106, the content provider may enter the beacon identifier and associate content with the identifier without first having to scan the device to detect the beacon signal and identifier transmitted by the device or otherwise communicated by the beacon signal.

The toy or other device 108, 110 or 112 including the beacon transmitter may be given to someone, e.g., as a gift, by the content provider. Alternatively the toy or other device 108, 110 or 112 may be sold to someone.

The user receiving toy, e.g., stuffed animal or device, may use his/her cell phone 102 or another user device such as a notepad to detect one or more beacon signals. The scanning may be done by an application 103 running on the cell phone 102, e.g., an application which will be referred to herein as a beacon based browser When the beacon based browser app 103 detects a beacon signal it stores the information in a beacon history log along with information about the time the beacon was detected. The user device 102 detecting the beacon may, and in some embodiments also does contact the beacon/content server 106 reporting detection of the beacon signal and/or other signals detected at a given time and seeking content associated with the received beacon signal and/or a set of signals which were detected.

The content server 106 checks its rules for supplying content corresponding to beacon signals which were reported as being received and, if there is stored content corresponding to reported beacon signal or signals and the logic associated with the content indicates it should be provided to a user or device in response to a reported detection event, access to the corresponding content is provided to the user, e.g., the content is supplied or the user device is provided with information which allows the content to be retrieved g, from another server. For example the user of a cell phone 102 detecting a beacon signal may be provided images or video associated by a content manager, e.g., owner of the device which transmitted the received beacon signal, with the reported received beacon signal.

Thus, for example, a boyfriend may give a cute stuffed animal 110 to his girlfriend which includes a beacon transmitter that transmits a beacon with a known beacon ID. The boyfriend can upload pictures to the content sever 106 and have them associated with the known beacon id of the beacon signal transmitted by the cute stuffed animal 110. The girlfriend can access the pictures and/or other contact using her cell phone 102 which detects the beacon signal transmitted by the cute stuffed animal 110, accesses the content server/register device 106, indicates the beacon identifier of the beacon signal transmitted by the animal 110 and time of receipt to the content server 106. The girlfriend will receive on her cell phone 102, in response, access to content the boyfriend associated with the beacon identifier. Over time the boyfriend, as the content manager and registered owner of bear 110 with beacon transmitter 111, may change the content associated with the beacon identifier corresponding to the stuffed animal 110 given to his girlfriend and as she access the content she will see the new content uploaded by her boyfriend on her cell phone 102. The same technique can be used to provide a grandmother or other family member provided with a stuffed animal to content uploaded by the content manager. For example a grandmother in a nursing home could be provided a stuffed animal 110 with a beacon transmitter 111. The grandmother could then use a notepad 121 running the beacon browser application 103 and obtain easy access to image or other content managed by the gift giver. In some embodiments the browser app 103 is built into an electronic photo display device which automatically retrieves photos and/or video content associated with beacon signals it detects. In such embodiments the person being provided the electronic photo album 121 need not have to execute a browser application with the application 103 automatically being enabled and set to retrieve and display content corresponding to detected beacon signals. In such a case while multiple individuals may have an electronic photo album implemented in accordance with the invention, e.g., in a nursing or retirement home, what images are displayed will depend on what beacon transmitters, e.g., stuffed animals 108, 110, 112 with embedded beacon transmitters, are placed in proximity to the photo album 121. Thus a person may be provided access to family photos or other content managed and supplied by another family member, friend or other content manager without having to know how to use a cell phone 102 or other device with a beacon browser application 103 that may need to be selected and executed by the user. In this manner one party can easily communicate photos and/or content to another person to whom a toy including a beacon transmitter 109, 111, or 113 is provided.

In some embodiment conditional logic may be associated with content to make content delivery contingent upon receipt of a set of beacon signals and/or other conditions such as time conditions and/or the absence of a signal.

Consider for example that some content can be associated with a set of beacon signals so that it is provided when signals corresponding to beacon identifiers BID1 and BID2 are both received within a given detection time period. Such a user of "AND" logic can be used to support embodiments where the content to be provided is to change based on the set of beacon signals detected within a time period.

For example, some content may be provided if the first BID1 transmitted by a first stuffed animal is detected but different content may be provided if a device reports detection of a set of beacon IDs, e.g., BID1, BID2 and BID3 in a given time period. Such an approach is particularly useful in game or toy applications where toy seller may seek to encourage the purchase of multiple stuffed animals 108, 110, 112. For example if a beacon ID transmitted by a toy pony is detected a video with a single pony may be streamed from the content server to the device reporting detection of the Beacon ID corresponding to the toy pony. However, if a Beacon ID corresponding to a toy pony and a toy horse is reported to a server content provided by a content manager associated with the "AND" of the two signals may be provided instead. Such content may include a video or story about a pony and a horse going on an adventure together for example while reporting of the pony associated beacon signal alone would result in content corresponding to just a phony story being provided reporting of the beacon id associated with the horse toy would result in a story or video corresponding to just a horse being provided. By rewarding users with more involved stories or stories corresponding to particular sets of animals corresponding to the set of stuffed toy animals a child has in his/her room or in close proximity, children and parents can be encouraged to collect the animals they want to hear stories about.

In addition, by providing content corresponding to groups of stuffed animals 108, 110, 112 or other toys based on the beacon signals individual the toys transmit, group play can be encouraged with children being encouraged to take different stuffed animals or toys to group play sessions to see what new games, videos or interactive utilities they can access based on the group of toys taken to the play session as opposed to their individual toys.

In some embodiments a history 176 of reported beacon signals and content access provided is maintained and used in determining what content should be supplied in response to a report of received beacon signals by a device. Thus the history information in table 176 maybe and sometimes is maintained on a per user device basis with different records recording the history corresponding to different devices 121, 102. For example, a boy and girl may exchange stuffed animals or other gifts including beacon signals.

When their cell phones 102 and/or other devices 121 are in proximity to the set of exchanged gifts and receive both signals they may be able to access a first set of shared content which either the boy or girl may manage. when only one signal is received, e.g., indicating the beacon transmitters are not in close proximity the boy maybe able to access only content managed by the girl who gave him the gift including the beacon signal the boy's cell phone can access while the girl can only access content managed by the boy who gave her the gift and includes the beacon signal associated with content managed by the boy.

In other variations, content supplied may depend not only on what set of beacon signals are received but what signals were received before and/or what content was previously supplied. For example sequential portions of a story may be supplied, e.g., on per day, in response to sequential accesses by a given device to the content sever reporting receipt of a particular beacon signal.

In some cases conditional logic which is based on some signals being reported but not others may be used with regard to what content is supplied. The conditional logic may further depend on history information with respect to what signal or signals were previously reported.

For example, after beacon signals corresponding to a boy and girl are reported and content provided, the same device corresponding to one of the boy and girl may be provided with a message from the other when a single one of the two beacon signals is reported after reporting detection of the two signals. For example, when a boy and girl access content within range of the respective gifts they exchanged they may be shown images or picture they previously took together. When one of them leaves the presence of the other taking the gift they received away, the beacon transmitter of only one of the gifts will be detected and a message from the other party may be displayed indicating how they miss not being with the party they just left.

Figure 3A:
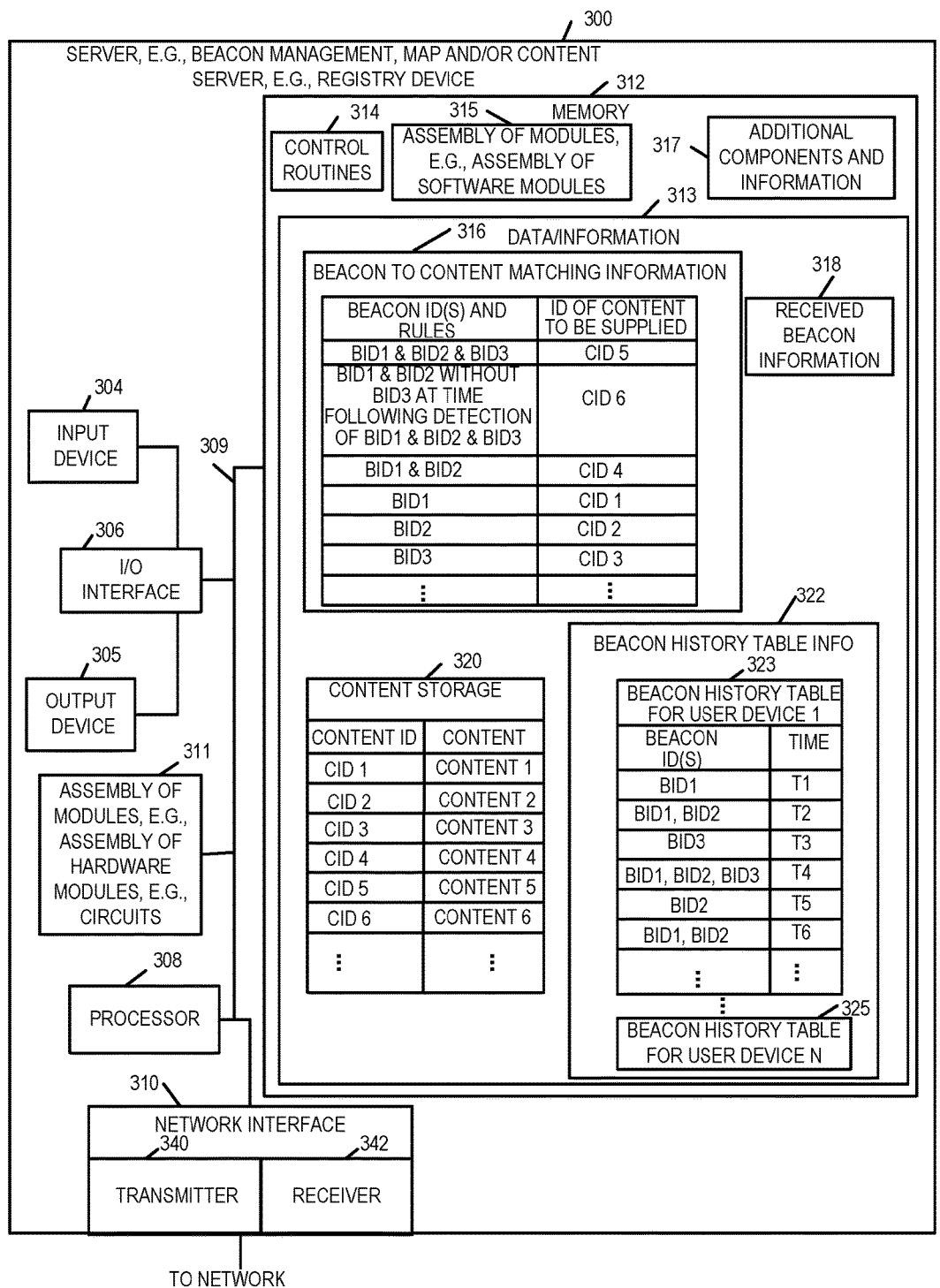
FIG. 3A is drawing of an exemplary server, e.g., a beacon management and/or content server, in accordance with an exemplary embodiment.

FIG. 3A is drawing of an exemplary server 300, e.g., a beacon management and/or content server, e.g., a registry server, in accordance with an exemplary embodiment. Exemplary server 300 includes an input device 304, e.g., a keyboard, mouse, etc., an output device 305, e.g., a display, an I/O interface 306, a processor 308, e.g., a CPU, a network interface 310, an assembly of modules 311, e.g., an assembly of hardware modules, e.g., circuits, a memory 312 and a bus 309. The input device 304 and output device 305 are coupled to the bus 309 via interface 306. The I/O interface 306, assembly of modules 311, processor 308, network interface 310 and memory 312 are coupled together via bus 309 over which the various elements may interchange data and information.

Network interface 310 includes a transmitter 340 and a receiver 342. The network interface couples the server 300 to a communications network, e.g., network 105, via which the server may communicate with user devices (102, . . . , 121, 104). Memory 312 includes control routines 314, an assembly of modules 315, e.g., an assembly of software modules, and data/information 313. Data/information 313 includes beacon to content matching information 316, received beacon information 318, content storage 320 and beacon history information 322.

Beacon to content matching information 316 includes: (i) beacon ID(s) and rules and (ii) corresponding ID of content to be supplied. Various examples will not be described regarding exemplary stored beacon to content matching information. If BID 1, BID2 and BID 3 are reported to have been received by a user device, then content corresponding to content ID=CID 5 is to be supplied to the user device. If BID 1 and BID 2 are reported to have been received without BID 3 at a time following detection of BID 1, BID 2 and BID 3, then content corresponding to content CID=6 is to be supplied to the user device. If BID and BID 2 without BID 3 are reported to have been received by a user device and it was not at a time following detection of BID 1, BID 2 and BID 3, then content corresponding to content CID=4 is to be supplied to the user device. If only BID 1 is reported to have been received then content corresponding to content CID=1 is to be supplied to the user device. If only BID 2 is reported to have been received then content corresponding to content CID=2 is to be supplied to the user device. If only BID 3 is reported to have been received then content corresponding to content CID=3 is to be supplied to the user device.

Content storage 320 includes content IDs and corresponding stored content for each content ID. For example, content ID=CID 1 corresponds to content 1; content ID=CID 2 corresponds to content 2; content ID=CID 3 corresponds to content 3; content ID=CID 4 corresponds to content 4; content ID=CID 5 corresponds to content 5.

Beacon history table information 322 includes a beacon history table for each of a plurality of user devices (beacon history table for user device 1 323, . . . , beacon history table for user device N 325). Beacon history table for user device 1 233 includes reported beacon ID(s) detected by user device 1 and corresponding detection times. For example, exemplary information 323 indicates that user device 1 detected: beacon ID(s)={BID 1} at T1; beacon ID(s)= {BID1, BID 2} at time T2; beacon ID(s)={BID 3} at time T3; beacon ID(s)={BID 1, BID 2, BID 3} at time T4; beacon ID(s)={BID 2} at time T5; and beacon ID(s)={BID 1, BID 2} at time T6.

In response to the BID 1 detection at T1 by user device 1, the server 300, in accordance with the beacon to content matching information 316 and stored content 320, supplied content 1 to user device 1. In response to the BID 1 and BID 2 detection at T2 by user device 1, the server 300, in accordance with the beacon to content matching information 316 and stored content 320, supplied content 4 to user device 1. In response to the BID 3 detection at T3 by user device 1, the server 300, in accordance with the beacon to content matching information 316 and stored content 320, supplied content 3 to user device 1. In response to the BID 1, BID 2 and BID 3 detection at T4 by user device 1, the server 300, in accordance with the beacon to content matching information 316 and stored content 320, supplied content 5 to user device 1. In response to the BID 2 detection at T5 by user device 1, the server 300, in accordance with the beacon to content matching information 316 and stored content 320, supplied content 2 to user device 1. In response to the BID 1 and BID 2 detection at T6 by user device 1, the server 300, in accordance with the beacon to content matching information 316 and stored content 320, supplied content 6 to user device 1.

In one exemplary embodiment server 300 is server 106; beacon content to mapping information 316 is beacon to content mapping information 170; content storage 320 is content storage 172; received beacon information 318 is received beacon information 174; and beacon history table information 322 is beacon history table information 176 of system 100 of FIG. 1.

Figure 4:
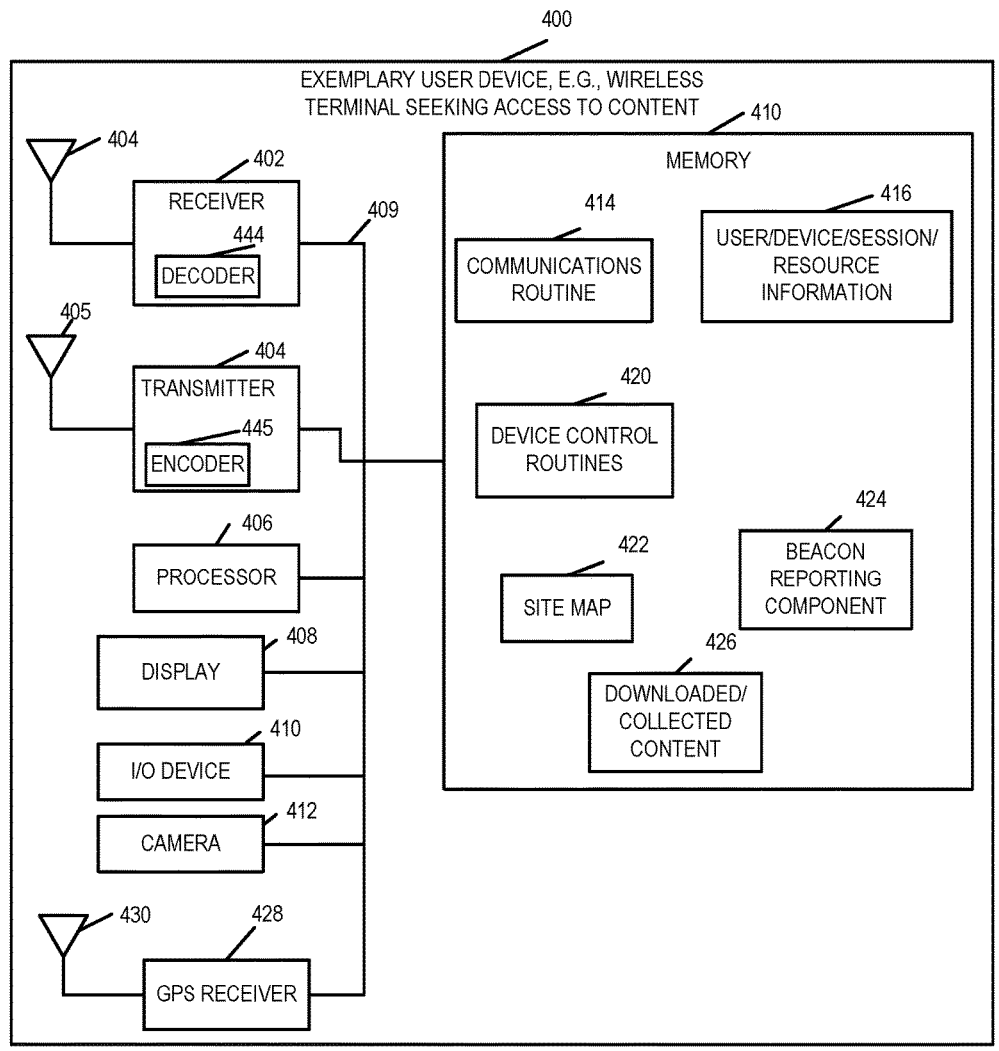
FIG. 4 is an exemplary user device, e.g., a user device of an end user of managed content, in accordance with an exemplary embodiment.

FIG. 4 is an exemplary user device 400, e.g., user device 1 102, in accordance with an exemplary embodiment. Exemplary user device 400 includes a wireless receiver 402, a wireless transmitter 404, a processor 406, e.g., a CPU, a display 408, an I/O device 410, a camera 412, and memory 410 coupled together via a bus 409 over which the various elements may interchange data and information. Wireless receiver 402 is coupled to a receive antenna 403 via which the user device may receive beacon signals, e.g., from beacon transmitters. Receiver 402 includes a decoder 444 for decoding received signals and recovering information. Receiver 402 also receives signals communicated from a server, e.g., via a base station in a communications network. Signals from the server include, e.g., content corresponding to a previously communicated set of detected beacons in accordance with content delivery rules. Wireless transmitter 404 is coupled to a transmit antenna 405 via which the user device may transmit signals to a server, e.g., indirectly via a base station in a communications network. Signals being communicated to the server include, e.g., information identifying a detected set of beacon signals, e.g., a set of detected beacon IDs, and a corresponding time.

Memory 410 includes a communications routine 414, device control routines 420 and user/device/session/resource information 416. The memory 410 also includes a beacon reporting component 424 which is responsible for reporting received beacon signals to the server 300 which is operating as the registry and map providing device. While called a beacon reporting component, component 424 may and sometimes does, also report to the server 300 the location of the UE device 400 determined by the GPS receiver 428 based on signals received via GPS signal receiver antenna 430. The memory 410 stores the site map 422 obtained from the server 300 and which is displayed at various times on the display 408. Updated map information replaces older site map information included in site map 422 when the updated map or information is received. While in some embodiments collected items and/or purchased content is stored solely at the registry server 300 other then when it is downloaded and/or temporarily stored prior to display, in at least some embodiments a copy of the collected information and/or purchased content or videos is downloaded and/or stored in memory 410 as downloaded and/or collected content 426. In such embodiments the user of the device 400 can access the collected or purchased content from the storage device, e.g., memory 410, on the user's device 400 even when it is not possible to connect to the registry server 300 via a communications network, e.g., the Internet.

Figure 5:
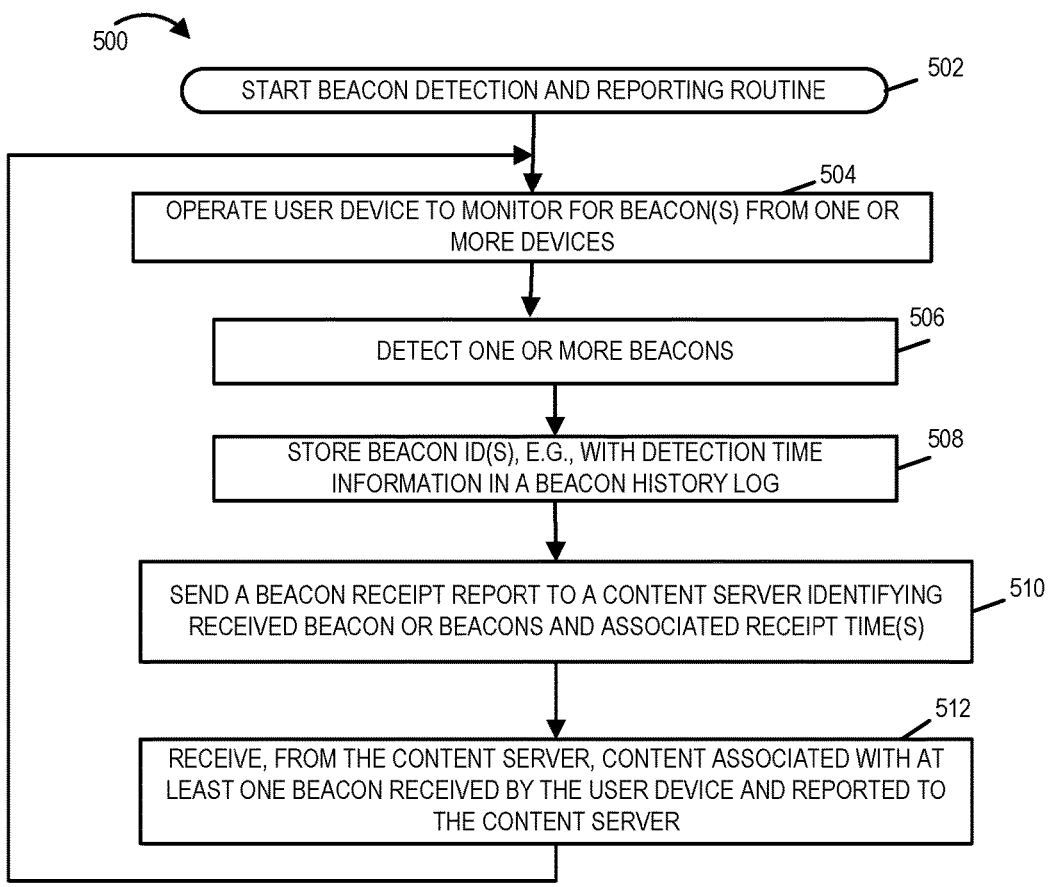
FIG. 5 is a flowchart of an exemplary method of operating a user device in accordance with an exemplary embodiment.

FIG. 5 is a flowchart of an exemplary method of operating a user device, e.g., user device 400, in accordance with an exemplary embodiment. Operation starts in step 502 in which the user device is powered on and initialized and the user device starts a beacon detection and reporting routine. Operation proceeds from step 502 to step 504, in which the user device monitors for beacon(s) from one or more devices. Operation proceeds from step 504 to step 506, in which the user device detects one or more beacons. Operation proceeds from step 506 to step 508. In step 508 the user device stores beacon ID(s), e.g., with detection time information in a beacon history log. Operation proceeds from step 508 to step 510, in which the user device sends a beacon receipt report to a content server identifying received beacon or beacons and associated receipt time(s). Operation proceeds from step 510 to step 512 in which the user device receives, from the content server, content associated with at least one beacon received by the user device and reported to the content server.

In one example, the user device implementing the method of flowchart 500 of FIG. 5 is user device 102, the server is server 106, and the detected beacons were transmitted by one or more or all of beacon transmitters (109, 111, 113).

Figure 6:
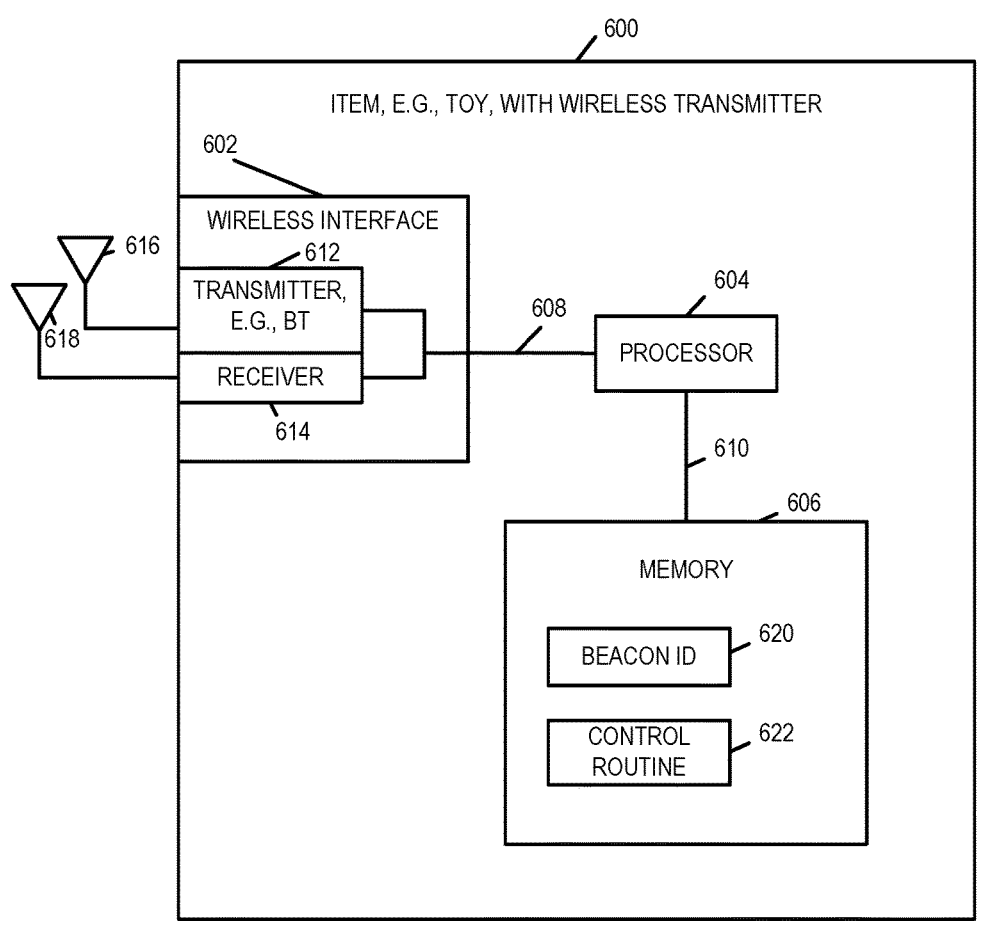
FIG. 6 is a drawing of an exemplary item, e.g., a toy, including a wireless transmitter, in accordance with an exemplary embodiment.

FIG. 6 is a drawing of an exemplary item 600, e.g., a toy, including a wireless transmitter 612, in accordance with an exemplary embodiment. Exemplary item 600 includes a wireless interface 602, a processor 604, and memory 606. Wireless interface 602 includes a transmitter coupled to transmit antenna 616, via which the item 600 can transmit wireless signals including beacons. Wireless interface 602 further includes a receiver 614 via which item 600 can receive wireless signals. Wireless interface 608 is coupled to processor 604, via communications link 608, e.g., a bus. Processor 604 is coupled to memory 606 via communications link 610, e.g., a bus. Memory 606 includes a beacon ID 620 and control routines 622. Control routines 622 are executed by processor 604 to control the operation of device 600. Control routines 622 are configured to control item 600 to generate and transmit beacon signals via wireless transmitter 612, said generated beacon signals communicating beacon ID 620. In one exemplary embodiment, devices (108, 110, 112) are each implemented in accordance with item 600 of FIG. 6, and each transmit a different beacon ID.

Figure 7:
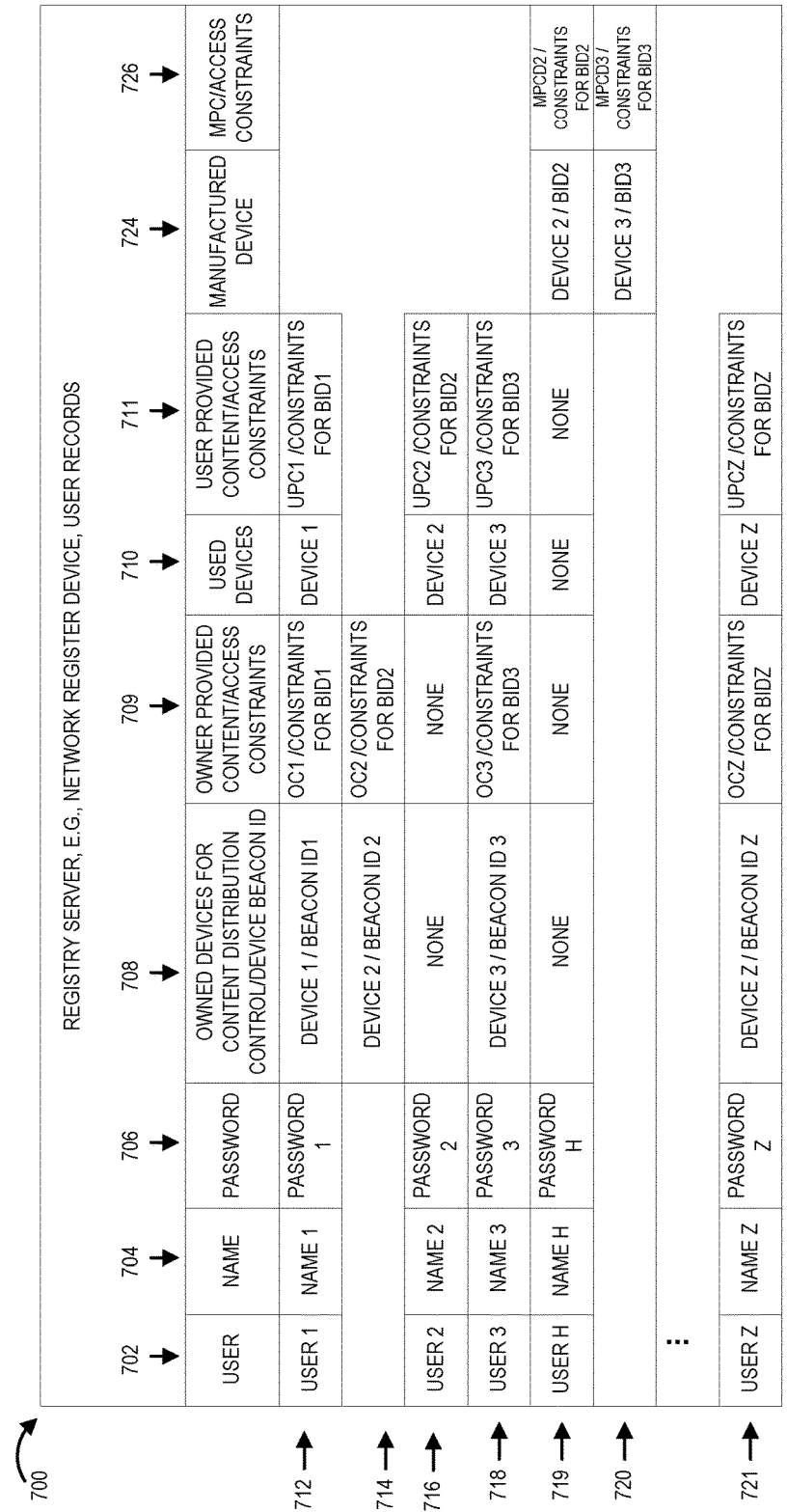
FIG. 7 is a drawing of an exemplary set of user records included in a registry server, e.g., a network registry device, in accordance with an exemplary embodiment.

FIG. 7 illustrates a set of records 700 in a registry device, e.g., the server 106 responsible for allowing users, owners, distributers, manufactures to manage content and supply access to content. The record 700 includes separate rows for each of the entities, owner, user, manufacturer, etc, which can associate content with a wireless signal and provide access constraints for the content they associate with a wireless signal.

The user records include records for a plurality of users of the registry service who have control over content or which can use wireless devices to report signals and access content. The user of the registry service may take on multiple roles with regard to a particular listed device that transmits a wireless signal, e.g., beacon, with which content can be associated. The listed owner of a device may be different than the user of the device. The records corresponding to a entity that has multiple different roles may be combined for compactness, e.g., with user and owner information included in the same row of the record table for example. The owner has control in some embodiments of content to be associated with wireless signals, e.g., beacon signals, transmitted by the device. For example, a parent may purchase a toy 108 for a child and be listed as the "owner" with control over content associated with toy 108 while the child may have his/her own record and be listed as a user of the device 108.

Each row 712, 714, 716, 718, 719, 720, . . . , 721 in the set of records 700 is a record corresponding to a user. Column 702 includes a user identifier. If a user identifier is not listed in column 702 for a row it indicates that the record corresponds to the user identified in row above the row without the user identifier. Thus multiple records, e.g., 712, 714 may be included for a single user, e.g., USER 1 or some other user. Column 704 includes a name of the user identified in column 1 704 while column 706 includes a password used by the user identified in the corresponding row to login to the register server 106. Column 708 identifies devices and, in some embodiments, includes the identifying Beacon ID transmitted by the device, that are owned by the user to which the record corresponds while column 710 lists devices that are used by the user of the row in which the used device is listed. Note that owner may be, and sometimes is, different from the user. For example Device 2 which transmits a beacon with beacon ID2 is owned by user 1 but used by user 2. Thus in row 712 owner provided content OC1 and corresponding owner provided access constraints (constraints for BID1) to the content associated with beacon ID1 shown in column 709, row 712 are provided by user 1 who is the owner of device 1. User 1 is also the owner of device 1 as shown in row 712 of column 708 and provides the user provided content (UPC1) and corresponding user provided access constrains for the user provided content associated with Beacon ID 1 as shown by the entry in row 712 column 711.

With regard to device 2 which transmits beacon ID 2 user 1 is the owner of device 2 as shown in row 714. However User 2 is the user of device 2 as indicated in row 716 column 710. Note that User 2 is not the registered owner of any wireless devices which transmit beacon signals with which content is associated and thus does not have owner content association privileges with any devices listed in record 700. However User 2 is the listed user of device 2 and can upload user provided content UPC2 and user provided constraints for access the user provided content UPC2 associated with BID2 transmitted by Device 2 as represented by the entries in row 716. While content is shown being stored in the registry server 700 instead of storing the actual content a link or address which can be used to store the content may be included in the registry in place of the content. In such a case the content may be, and sometimes is, stored on a different server or storage device than the storage device used to store record 700.

Row 716 is a record for User 2 while Row 718 includes a record for User 3 and row 720 includes a record for User Z. The record 700 may include separate rows for manufactures/distributers so that they can log in and associate content with devices for which they are identified as a manufacturer and/or distributor with corresponding content association and access control privileges.

Rows 719 and 720 are rows for a manufacturer with a user ID=user H, name=name H, and password=Password H. Column 724 is used to list devices which were manufactured by a manufacture while column 726 lists manufacturer provided content (MPC) and corresponding manufacturer provided access constraints.

Row 719 column 724 indicates that device 2 with beacon ID=BID2 was manufactured by the manufacturer with name H. Row 719 column 726 indicates that device 2 with beacon ID=BID2 has manufacturer provided content/access constraints MPCD2 which are constraints corresponding to BID2. Row 720 column 719 indicates that device 3 with beacon ID=BID3 was manufactured by the manufacturer with name H. Row 720 column 726 indicates that device 3 with beacon ID=BID3 has manufacturer provided content/access constraints MPCD3 which are constraints corresponding to BID3.

Thus it should be appreciated that the manufacturer can associated content with devices. While the manufacturer may make multiple toys of the same type the content associated with the particular toy via the content registry allows the manufacturer to sell different versions of the same toy with the main difference in some cases being how much content the manufacture associates via the registry 106 with the toy which includes a wireless transmitter. For example one version of the bear may provide access to a limited set of content, e.g., stories, while another version of the same bear may be associated with a larger set of content, e.g., a full set or series of stories which can be accessed when the beacon signal from the bear is received.

In some embodiments, the owner of a device may have different content uploading and association rights than the user of the device. For example, in some embodiments the owner of the device can associate and provide content which is accessible to the listed user of the device and other content which is accessible to others, e.g., entities which are not listed as users but which may, like the listed user, report receipt of wireless signals transmitted by the device. Rules and/or constraints in terms of what wireless signals need to be received for content access to be permitted and/or other constraints such as wireless signals which must have been reported before the listed set of wireless signals or a change in wireless signals maybe and sometimes are stored with the content. Thus an owner or user has control over access to content since they can set rules and/or other constraints which must be satisfied to access content they provide.

In some embodiments other entities also have authority to associate content with one or more wireless signals owned by another entity and set rules for content they provide. For example, a manufacturer or distributor, e.g., retailer, of a device which is sold and registered as being owned by someone else may have authority to associate content, e.g., Ebooks with wireless signals transmitted by the listed device and set rules for controlling access to such content. For example, a retailer may provide a book subscription with the sale of a device including a beacon transmitter, such as device 110, allowing for other devices, e.g., cell phones and Ebook readers which receive the beacon signal transmitted by the device, to report receipt of the transmitted beacon signal and access the manufacturer or distributor provided content.

In some embodiments the registered user of a device does not have authority to allow others to access the owner provided content associated with the beacon signal transmitted by the device 108 but can associate content provided by the user with the beacon signal transmitted by the device 108 which others are allowed to access in accordance with user provided rules.

In some embodiments the records shown in FIG. 7 are stored in and used by the server 106 which acts as a network registry device which can map received beacon signals reported to the server 106 to content and provide access to the content either directly or by providing a link or address used access the content. The record 700 may be part of beacon to content mapping information 170 shown in FIG. 1.

Figure 8A:
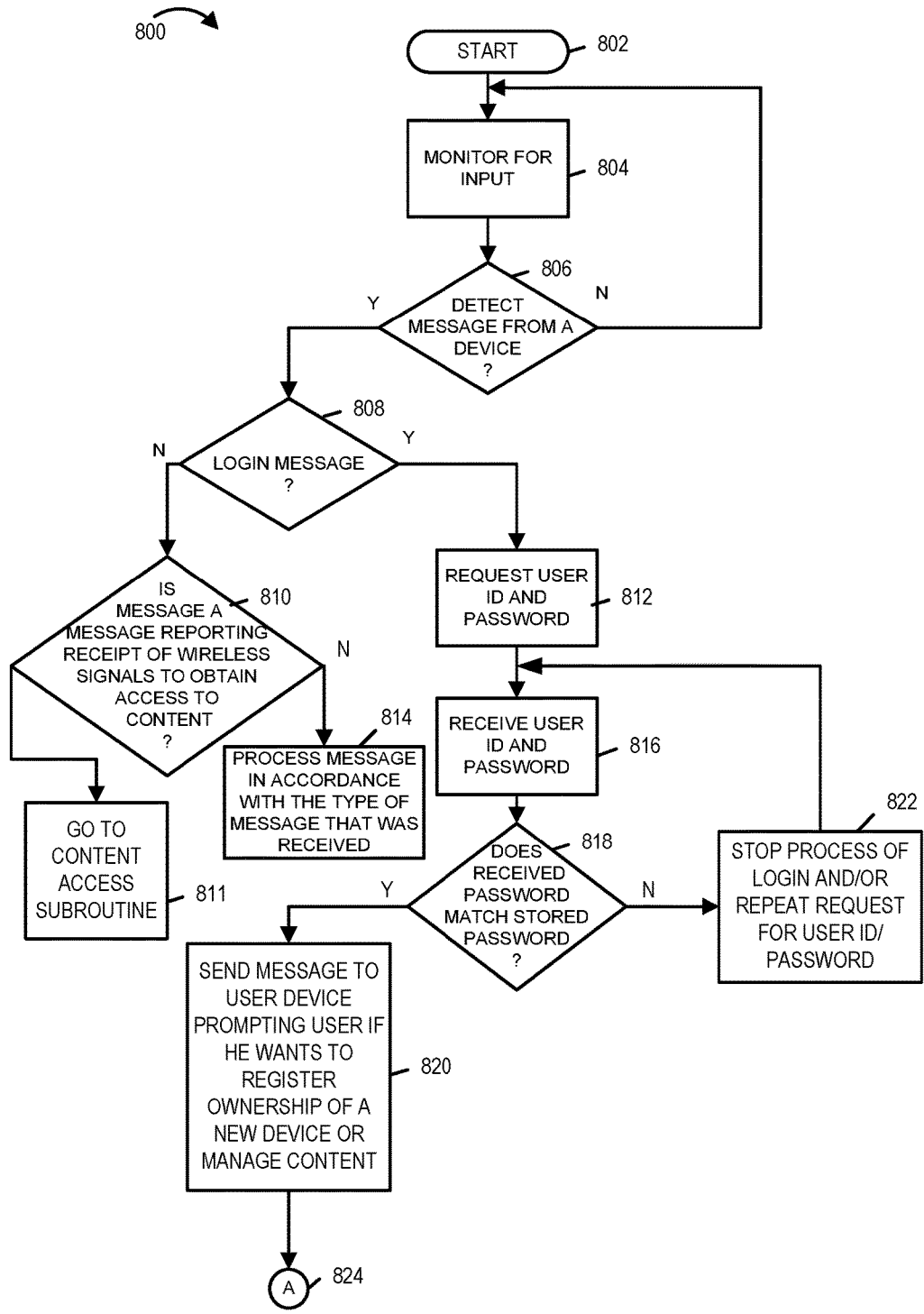
FIG. 8A is a first part of a flow chart showing steps of a method that may implemented by a register node such as the beacon management and/or content server of FIG. 1 to maintain associations between wireless devices, information on which devices are owned and used by particular individuals and/or content management information.
Figure 8B:
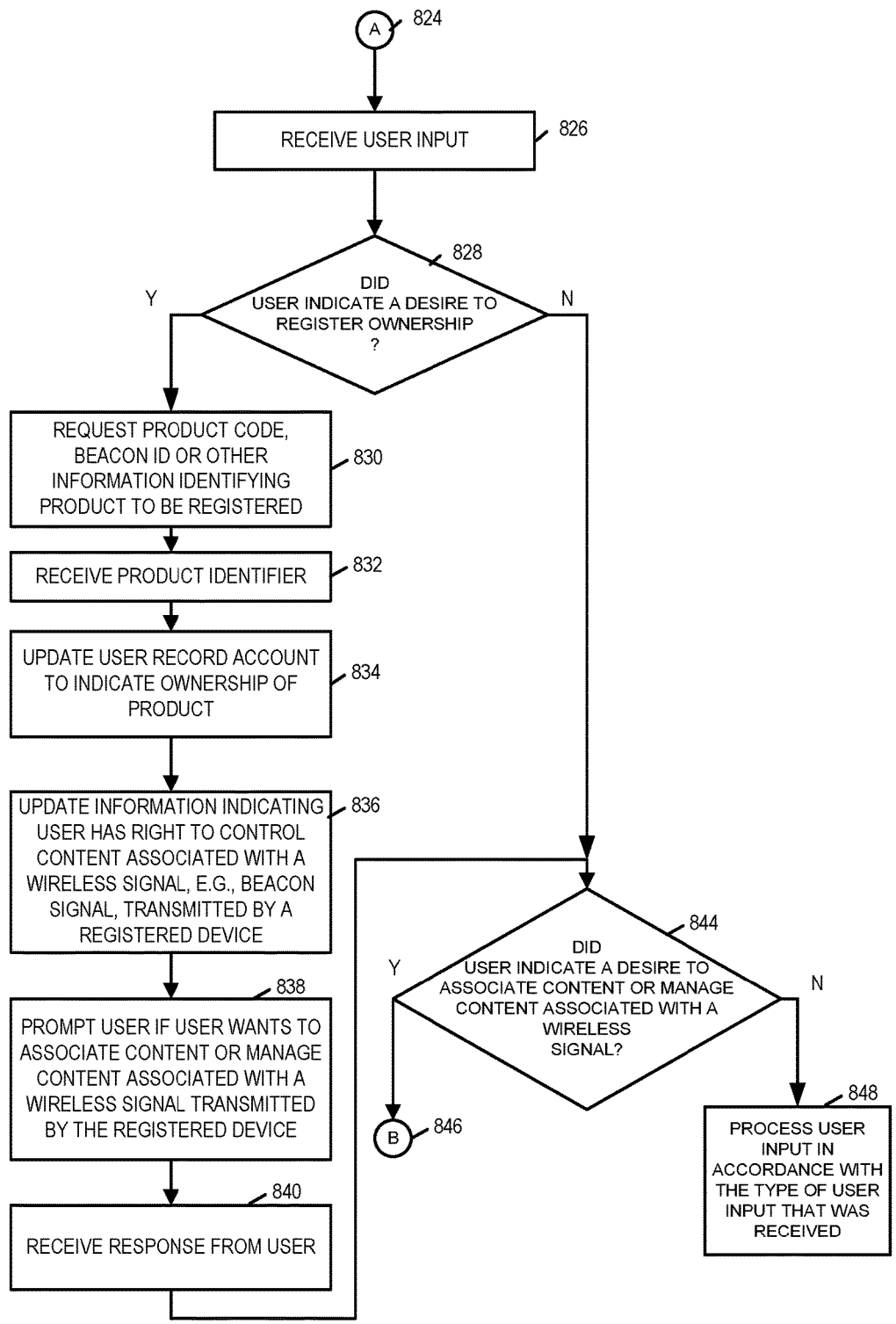
FIG. 8B is a second part of the flow chart shown in FIG. 8A.
Figure 8C:
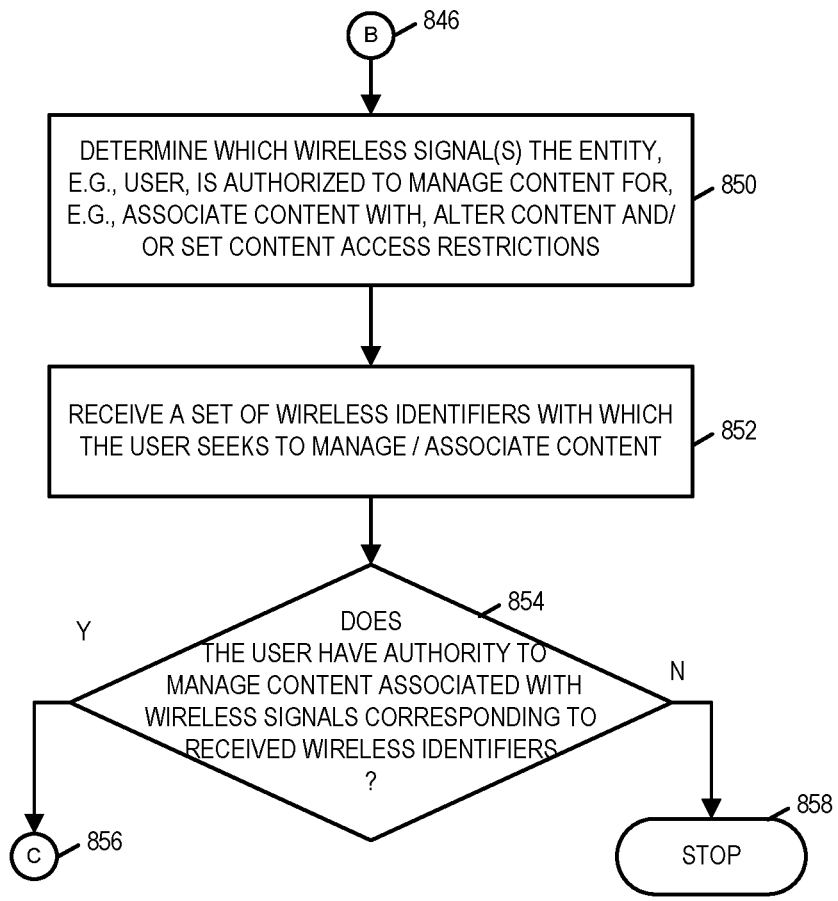
FIG. 8C is a third part of the flow chart shown in FIG. 8A.

FIG. 8, which comprises the combination of FIGS. 8A, 8B, 8C and 8D, shows the steps 800 of a method which may be implemented by the registry device 106. The method allows users to control access to content which they may supply or for which they supply links to. The links, when used to provide access to content, can be used by the device receiving the link to access the content, e.g., on content server 195 which store and can supply content to devices on the Internet 105.

The method starts in step 802, e.g., with the registry device 106 being powered on. Operation proceeds from step 802 to step 804 in which the registry device 106 monitors for input, e.g., messages from user devices and/or entities seeking access to content, seeking to provide content or links to content and/or seeking to set content access restrictions. Thus messages received by the device 106 may be from various entities including users of devices which receive beacon signals, users of the register service which seek to associate content with wireless signals, manufacturers seeking to provide content to devices receiving wireless signals from devices they manufactured and control access to manufacture provided content, owners of devices which transmit beacon signals, etc.

In step 806 a check is made to determine if a message was received from a device. If no message was received operation proceeds again to the monitoring step 804, but if a message was received the message will be processed based on the type of message received. Operation proceeds from step 806 to step 808 when a message is detected as having been received in step 806. In step 808 a check is made to determine if the received message is a LOGIN message in which a user of the register service seeks to login before taking some action.

Figure 10A:
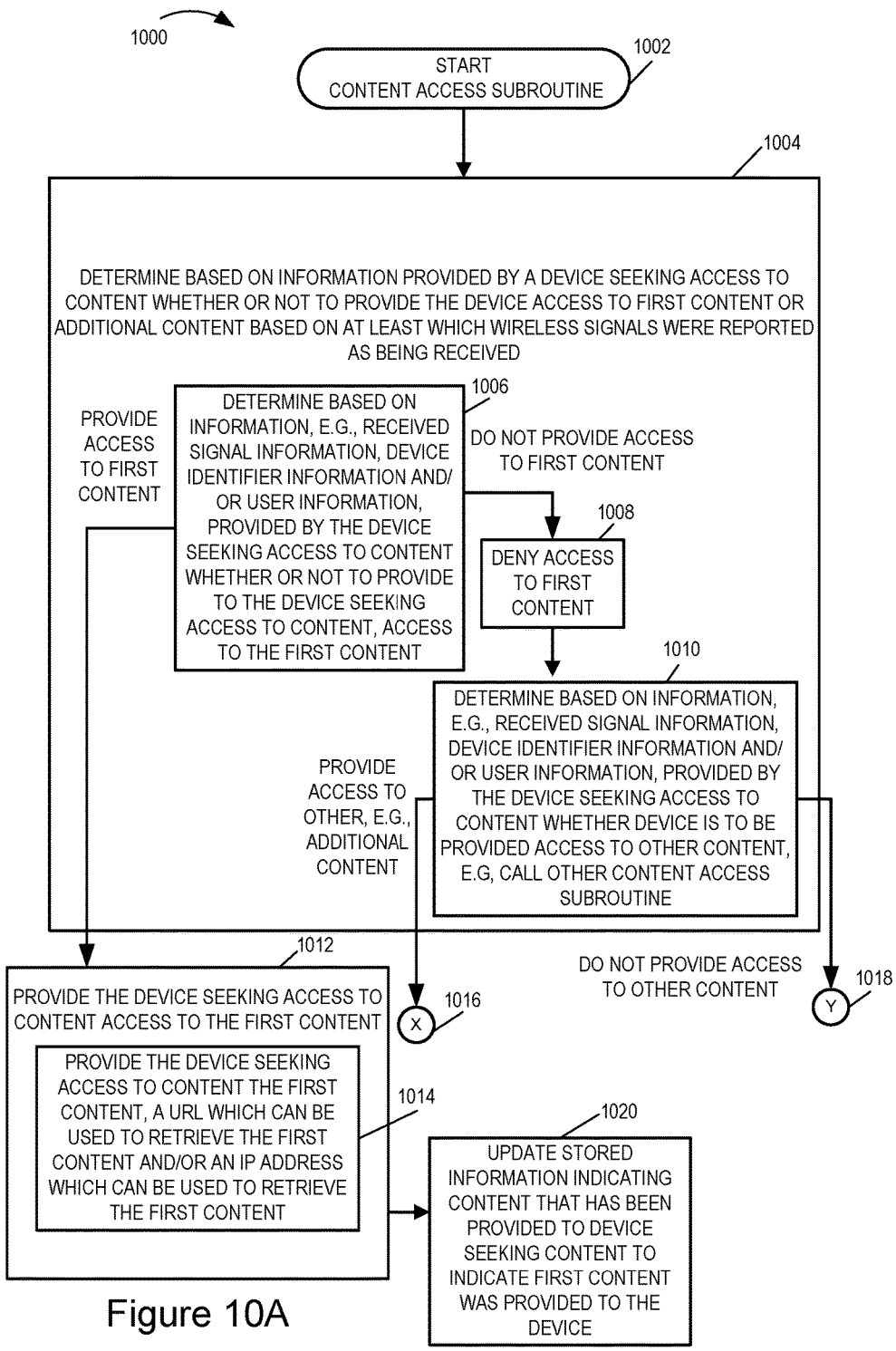
FIG. 10A shows a first part of a content access subroutine and the steps of the subroutine which maybe implemented the steps of a content control subroutine which maybe implemented by a register node such as the beacon management and/or content server of FIG. 1.
Figures 10, 10A, 10B:
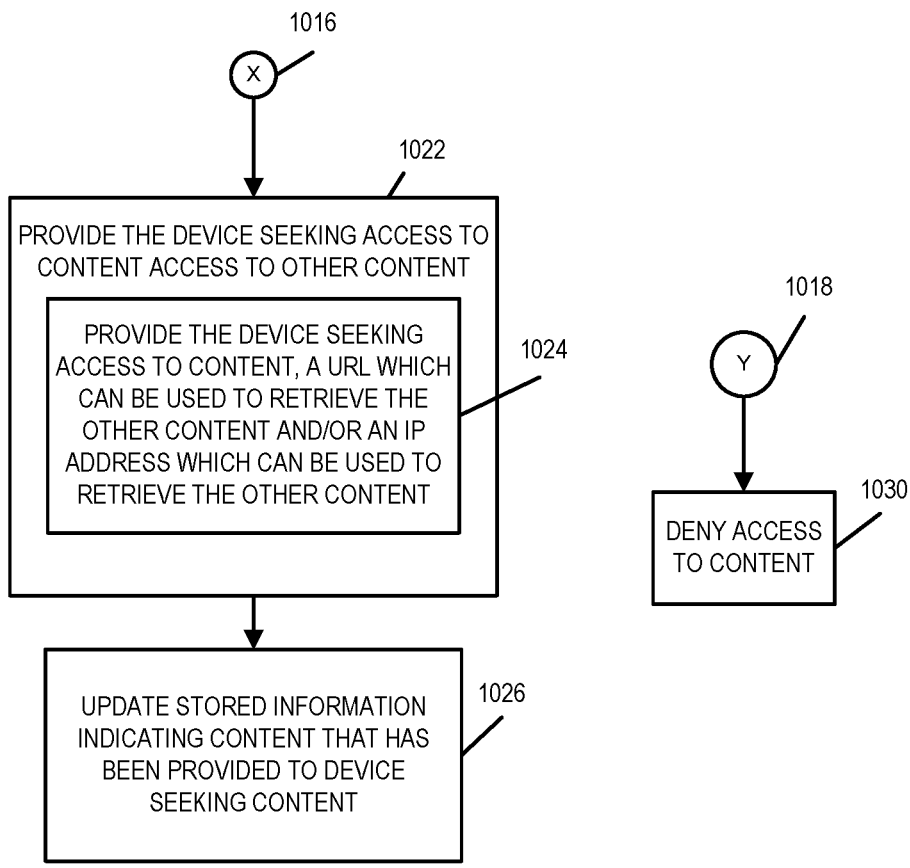
FIG. 10B shows a first part of a content access subroutine and the steps of the subroutine which maybe implemented the steps of a content control subroutine which maybe implemented by a register node such as the beacon management and/or content server of FIG. 1.
FIG. 10 shows have FIGS. 10A and 10B form a single flow chart.

If in step 808 it is determined that a login message was not received, e.g., another type of message such as one seeking access to content and reporting the receipt of wireless signals was received, operation proceeds from step 808 to step 810. In step 810 the message is checked to determine if it is a message reporting receipt of wireless signals and seeking access to content. If the received message is not a message reporting the receipt of wireless signals and seeking access to content, operation proceeds from step 810 to step 814 in which the message is then processed in accordance with the type of message that was received. If however in step 810 it is determined that the received message is a message reporting the receipt of wireless signals seeking access to content, a content access subroutine is called in step 811 and operation proceeds to the called subroutine. The routine shown in FIG. 10, which comprises the combination of FIGS. 10A and 10B, is an exemplary content access subroutine which can be called in step 811 and will be discussed further below.

Referring once again to FIG. 8, if it is determined in step 808 that the received message is a login message, operation proceeds to step 812 in which the register device 106 sends a request to the device of the user seeking to login requesting the user to provide a user ID and password. In step 816 the user ID and password is received for processing. Then in step 818 a check is made to determine if the received password matches the password for the identified user which is retrieved from the record in the set of records 700 corresponding to the received user ID. If in step 818 it is determined that the received password does not match the stored password, operation process to step 822 in which the login process is stopped and/or a request for a user ID and password is sent again to the device being used to login. In the case where a repeated request for user ID and password is sent, operation proceeds from step 822 to step 816.

If however, in step 818 it is determined that the received password matches the password of the user identified by the received User ID operation proceeds to step 820 to determine what action the user is seeking to take. In step 820 a message is sent to the user device which logged in to control the device to prompt the user if he wants to register ownership of a new device or manage content. Management of content may involve associating content with a set of one or more wireless signals and/or setting constraints with regard to access to content provided by the user of the register service. Operation proceeds via connecting node A 824 to step 826 shown in FIG. 8B.

In step 826 user input communicated from a user device, e.g., device 121 or 102 is received by registry device 106. Operation then proceeds to step 828 in which a check is made to determine if the user input indicates a desire to register ownership, e.g., of a device which transmits a wireless signal such as a beacon signal having a known beacon ID. The device whose ownership is being registered may be one of the devices 108, 110, 112 or another device capable of transmitting a wireless signal. If in step 828 it is determined that the user has indicated a desire to register ownership of a device, operation proceeds to step 830. In step 830 product code, beacon ID or other information identifying the product to be register is requested. In step 832 a product identifier entered by a user of the register service seeking to register ownership of a device is received. The product identifier may be printed on the packaging of a toy or transmitter device to be registered for easy use or may be a beacon signal ID detected by the device of 121, 102 of the user performing the registration operation. In step 834 the registry device 106 updates information in the set of records 700 indicating the user of the register service registering the device 108, 110 or 112 is the owner of the device and then in step 836 the set of records 700 is updated to indicate that the user registering the device has the right to control content associated with a wireless signal, e.g., beacon signal, transmitted by the registered device. The beacon ID of the signal transmitted by the device may be stored in the set of records 700 as well.

Operation proceeds from step 836 to step 836 in which the registry device 106 sends a message to the user device being used to register ownership prompting the user if the user wants to associate content or manage content associated with the wireless signal transmitted by the device 108, 110, 112 who's ownership was just registered. In step 840 a response is received to the user prompt, and then operation proceeds to step 844.

If in step 828 it was determined that the user did not indicate a desire to register ownership of a device, operation proceeds directly from step 828 to step 844 skipping the ownership registration steps which are included on the path starting with step 830.

In step 844 a determination is made as to whether the user of the device sending the input to the registry device 106 indicated a desire to associate content or manage content associated with a wireless signal. If the answer to the check made in step 844 is no, operation proceeds to step 848 in which the user input is processed in accordance with the type of user input that was received.

If however in step 844 is as determined that the user indicated a desire to associate content or manage content associated with a wireless signal, e.g., a beacon ID, operation proceeds from step 844 to step 850 shown in FIG. 8C via connecting node B 846.

In step 850 a determination is made as to which wireless signal or signals the entity, e.g., user of the register service, is authorized to mange content for, e.g., associate content with, alter content and/or set content access restrictions for. This information is obtained in some embodiments from the set of records 700 and is used to prevent an entity from changing content associated with wireless signals that the entity has not right to associate content with.

Operation proceeds from step 850 to step 852. In step 852 a set of one or more wireless identifiers with which the user seeks to manage and/or associate content is received by the register device 106. Then in step 854 a determination is made as to whether the user has authority to manage content associated with the wireless signal or signal corresponding to the received wireless identifiers. If the user of the register service does not have authority to manage content with regard to the signals corresponding to the wireless identifiers processing of the user's input is stopped in step 858.

If in step 854 it is determined that the user of the register device 106 indicated a desire to associate content or manage content associated with a wireless signal, operation proceeds via connecting node C 856 to step 860 shown in FIG. 8D. In step 860 rules which need to be satisfied and requirements in terms of which signals need to be reported as being received to obtain access to first content are set, e.g., stored, for use in controlling future access to the first content.

In step 860 the register device, which is a network device, is operated to store content access constraint information, e.g., in an entry in the set of records 700. The access constraint information includes one or more of: i) a first set of wireless identifiers including one or more signal identifiers, e.g., beacon IDs, associated with first content and ii) a first set of rules, including one or more rules, for determining when a device seeking access to content is to be provided access to the first content. The first set of rules includes in some but not necessarily all embodiments a rule which depends on the receipt of different wireless signals in different time periods by the device seeking access to content or makes access to the first content dependent on an identify of the device seeking access to the first content or a user of the device seeking access to the first content. For example, the first set of rules may include a rule requiring that a previously received beacon signal was not received for several minutes, day or days after having been received before access to the first content is granted. Alternatively, the first set of rules may require that after receipt of a first set of identified beacon signals a second set of beacon signals including a beacon signal not included in the first set is received with the second set of beacon signals being received at least a specified amount of time, e.g., minutes, a day, or days after the first set of beacon signals was received. In addition or alternatively, the first set of rules may include a rule that requires that the device seeking access be one of a list of specified devices which are allowed to access first content and further that a specified set of beacon signals be reported as having been received by the device seeking access. While in many cases the device 121 or 102 seeking access to content has a single user and thus in which case a device identifier can be used as a user identifier, in some cases a device 121 or 102 may be shared in which case content access can be restricted based on receipt of a user identifier in addition to, or in place of, a device identifier of the device 121 or 102 seeking access to content. It should be appreciated messages sent to the register service to obtain services, access content or control content access restrictions normally include a device identifier of the device 102 or 121 seeking access but may also include a user identifier. As part of step 860 the register device 106 may and sometimes does store constraint information which must be satisfied for a device to access other content.

In the case of content access request messages sent from device 121 or 102 seeking access to content normally includes a device identifier, optionally a user identifier, information, e.g., beacon IDs, identifying one or more signals received in a current signal capture time period by the device seeking access to content and optionally information indicating wireless signals received in one or more earlier wireless signal capture time periods. The wireless signal capture information may be in the form of a wireless signal capture record including information for different time periods for minutes, days or weeks with each capture time period in some embodiments corresponding to an interval less then a minute long. In other embodiments, each time capture period for which wireless signal capture is reported is several minutes long. The wireless signal capture time periods may be, and sometimes are, of fixed durations, e.g., each capture time period corresponding to a multi-minute period, e.g., a 5 minute or longer wireless signal capture time period.

In some embodiments step 860 includes operation steps 862, 864, 866 which may be performed as part of step 860. In step 862 a determination is made if the entity, e.g., user seeking to set constraints, seeks to set user specific or device specific constraints where a user or device seeking access to content is taken into consideration. Such constraints are useful where access is to be provided to a set of devices in a group but devices outside the group are not to be provided access or are to be provided access to other content. If the user is not seeking to set user specific or device specific access constraints, operation proceeds to step 866 in which the entity seeking to control access to content and/or association of content with one or more wireless signals is provided control over which content is to be supplied to a device reporting receipt of wireless signals irrespective of which device is seeking the content or the user of the device seeking content. In step 866 the entity to which control is provided is allowed to specify a set of wireless signals which must be reported as being received to gain access to particular content and may also specify time dependent constraints such as the requirement that different sets of wireless signals be received in a particular temporal sequence to obtain access to specific content.

In optional step 864 which is performed when in 862 it is determined that the entity controlling access to content wants to set device or user dependent access constrains, the entity is allowed to set constraints which result in different users or devices being provided access to different content, e.g., even when reporting receipt of the same set of wireless signals. The content control subroutine 900 shown in FIG. 9 may be called as part of step 864.

Figure 9:
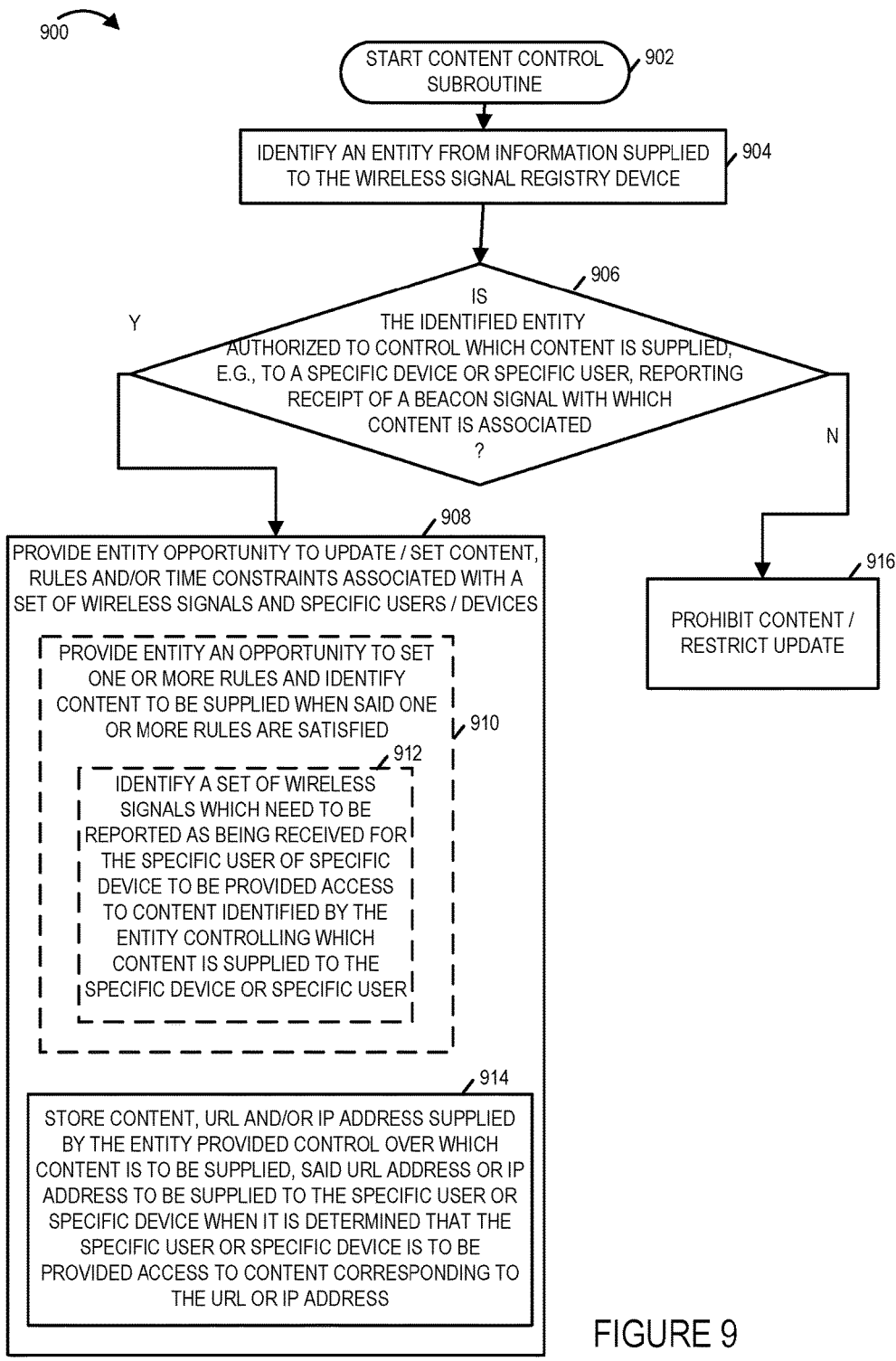
FIG. 9 shows the steps of a content control subroutine which maybe implemented by a register node such as the beacon management and/or content server of FIG. 1.

Content control subroutine 900 shown in FIG. 9 will now be discussed in detail. The content control subroutine which is used to set content access restrictions, change content to be provided and/or associate content with one or more sets of wireless signals will now be described. The method starts in step 902 with operation proceeding to step 904 in which the entity seeking to set or control access is identified from information supplied to the wireless signal registry device 106. Then in step 906 a check is made to determine if the identified entity has authority to control the association and accessing of content corresponding to a set of wireless signals with which content access restrictions and/or content associations are to be made where some of the content restrictions may be dependent on which device or user is seeking access to content.

If the entity seeking to set content restrictions is not authorized to control access to content associated with the wireless signals he is seeking to control associations and/or content access restrictions operation proceeds to step 916 where the entity is prohibited from controlling content access or updating the content associated with one or more wireless signals.

If however in step 906 the entity seeking to control content access is authorized to make such changes and/or set restrictions operation proceeds to step 908. In step 908 the entity seeking to control access to content is provided an opportunity to update and/or associate content with one or more sets of wireless signals and to set access constraints including, in some cases, user or device dependent access constraints.

Step 908 in some embodiments includes step 910. In step 910 the entity seeking to control access to content is provided an opportunity to set one or more rules and identify content to be supplied or provided access to when the one or more rules are satisfied. The rules may include rules which are dependent on a particular device or user requesting access to content with some requesting devices or users being provided access to content not provided to some other devices or users who receive the same wireless signal as the requesting device. Step 912 may be and sometimes is performed as part of step 910. In step 912 a set of wireless signals is identified, e.g., specified, which need to be received for a specific user or device which is also specified to be provided access to the content associated with the specified set of wireless signals. For example the entity can specify a rule that to receive access to content M a device may have to be device J and report receipt of signals BS1 and BS2. The entity may specify that if another device than device J reports receipt of signals BS1 and BS2 the other device is to be provided with other content, e.g., content F.

As part of step 908 content, a URL and/or an IP address supplied by the entity setting the content constraints are stored in step 914 and are associated with the constraints, e.g., rules, used to determine when access is to be provided, e.g., to the supplied content, e.g., in the record 700.

FIG. 10, which comprises the combination of FIGS. 10A and 10B will now be described. FIG. 10 shows the steps 1000 of a content access subroutine which can be used by the registry device 106 to control access to content associated with one or more sets of wireless signals. The subroutine 1000 starts in step 1002, e.g., when called or accessed via step 811 of the method shown in FIG. 8 or from another step.

The routine 1000, which is used to determine what if any access to content should be provided to a device reporting the receipt of wireless signals and seeking access to content starts in step 1002 and proceeds to determination step 1004. In determination step 1004, the registry device 106 determines what if any content access should be provided to the device seeking access to content based on information, e.g., a report of received wireless signals in one or more time periods, a device identify and/or a user identifier, provided by the device 102 or 121 seeking access to content. Step 1004 includes determining based on information provided by the device seeking access to content whether or not to provide the device access to first content or additional content based on at least which wireless signals were reported as being received by the device seeking the access to content.

Step 1004 includes in some embodiments steps 1006, 1008 and 1010. In step 1006 a determination is made based on information, e.g., received signal information, device identifier information and/or user information, provided by the device seeking access to content whether or not to provide access to the first content. For example, in step 1006 a check is made to determine if rules and/or constraints associated with first content are satisfied by the device seeking access to content and if so the device is provided access to the first content but otherwise the decision is made not to provide the device access to the first content. For example, if a constraint requires that a particular wireless signal has been received to gain access to the first content and the receipt of such a signal is not reported access to the first content is denied. Or consider a more complicated example where different specific sets of signals need to have been received in different time periods separated by a predetermined amount of time to gain access to the first content and one of the sets of wireless signals was not received or there was not the predetermined amount of time, e.g. a day or more, between the receipt of the sets of signals then access to the first content would be denied.

If in step 1006 the decision is to deny access to provide access to the first content, operation proceeds from step 1006 to step 1012 in which the registry device 106 provides access to the first content. In some embodiments step 1012 includes step 1014. In step 1014 the device seeking access to content is provided access to the first content, e.g., supplied with the first content or provided with a URL or IP address which can be used to access the first content. Operation proceeds from step 1014 to step 1020 wherein the registry device 106 updates stored information indicating what content has been provided to the device seeking access to content. The information is updated to indicate the device was supplied with the first content. This information can be accessed by a constraint, e.g., which may be set so the same content is not provided to the device multiple times.

If however in step 1006 the decision is to not provide access to the first content to the device seeking access, operation proceeds to step 1008 wherein access to the first content is denied and then operation proceeds to step 1010 where a decision is made whether or not to provide access to additional content. Consider for example that while the information received from the device seeking access to content may not have satisfied the rules and/or requirements for providing access to the first content the information may still indicate that the device is to be provided access to some other content. Step 1010 may and in some embodiments does involve a call to the other content access subroutine shown in FIG. 11 which will now be described.

The other content access subroutine includes steps 1100 and starts in step 1102. Operation proceeds from start step 1102 to decision step 1104. In decision step 1104 a decision is made whether or not the information received from the wireless device seeking access to content, e.g., list of received wireless signals, device identifier and/or user identifier satisfies one or more sets of rules or constraints, e.g., stored in record 1700, that would entitle the device to access at least some content. Step 1104 may be part of step 1010 in some embodiments rather than a separate step. If it is determined that the requesting device is not entitled to access content based on the received information, operation proceeds via connecting node Y 1018 to deny access to content step 1030 (see FIG. 10B) and the requesting is denied access to content.

However, if in step 1104 it is determined that the requesting device is entitled to access some content operation proceeds to step 1106. In step 1106 the registry device 106 determines what additional content is to be provided based on one, more or all of: which wireless signals were reported as being received, which device is seeking access to content, what content was previously provided to the device seeking access to content, which one of a plurality of wireless signals which were previously reported as being received is no longer being reported as being received, what new additional signal is reported as being received. Step 1106 may also consider the amount of time between the last time a particular signal was being received and a current received signal report in which the previously received signal is no longer being received.

In some embodiments a time constraint may be specified and considered in step 1106. The time constraint may be a minimum amount of time since a signal was last reported as being received by the device requesting content before access will be provided to a particular piece of content. Where the beacon signals correspond to devices carried by people, the time serves as a minimum amount of time the people are separated from each other before specific content, e.g., content provided by person no longer present will be supplied to the other person.

Once the content to which access is to be provided is determined in step 1106, operation proceeds via connecting node X 1016 to step 1022 of FIG. 10B.

Figure 11:
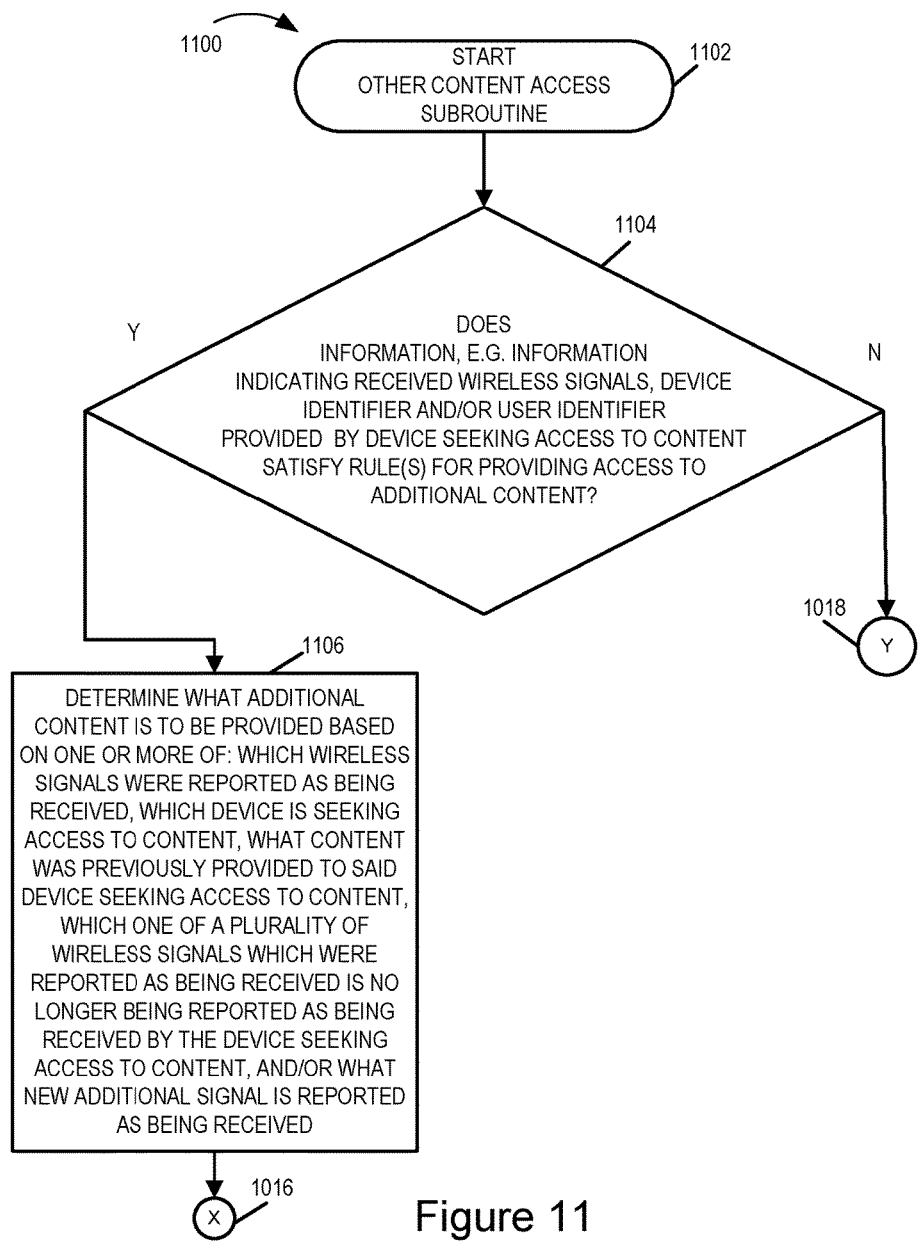

Referring once again to FIG. 10A, if step 1010 did not involve a call to the subroutine of FIG. 11, operation would proceed from step 1010 via connecting node X1016 to step 1022 when it is determined that the registry device 106 is to provide access to other content than the first content, e.g., additional content. If in step 1010 it was determined not to provide access to other content and the subroutine of FIG. 11 was not called, operation proceeds from step 1010 to deny access to content step 1030 via connecting node Y 1018.

In step 1022 the device seeing access to content is provided access to other content, e.g., content other than the first content for which access was denied. Step 1022 in some embodiments involves providing access to the content identified in step 1106 which the requesting device is entitled to access. Step 1022 in some embodiments includes step 1024. In step 1024 the device seeking access to content is provided access to content by the registry device 106 supplying the content which the device is allowed to access or by the registry device 106 supplying a URL or IP address which can be used to access the content which is stored in the content store 196 of the Internet content server 195 which is accessible via the Internet 105 in the FIG. 1 system.

Figure 12:
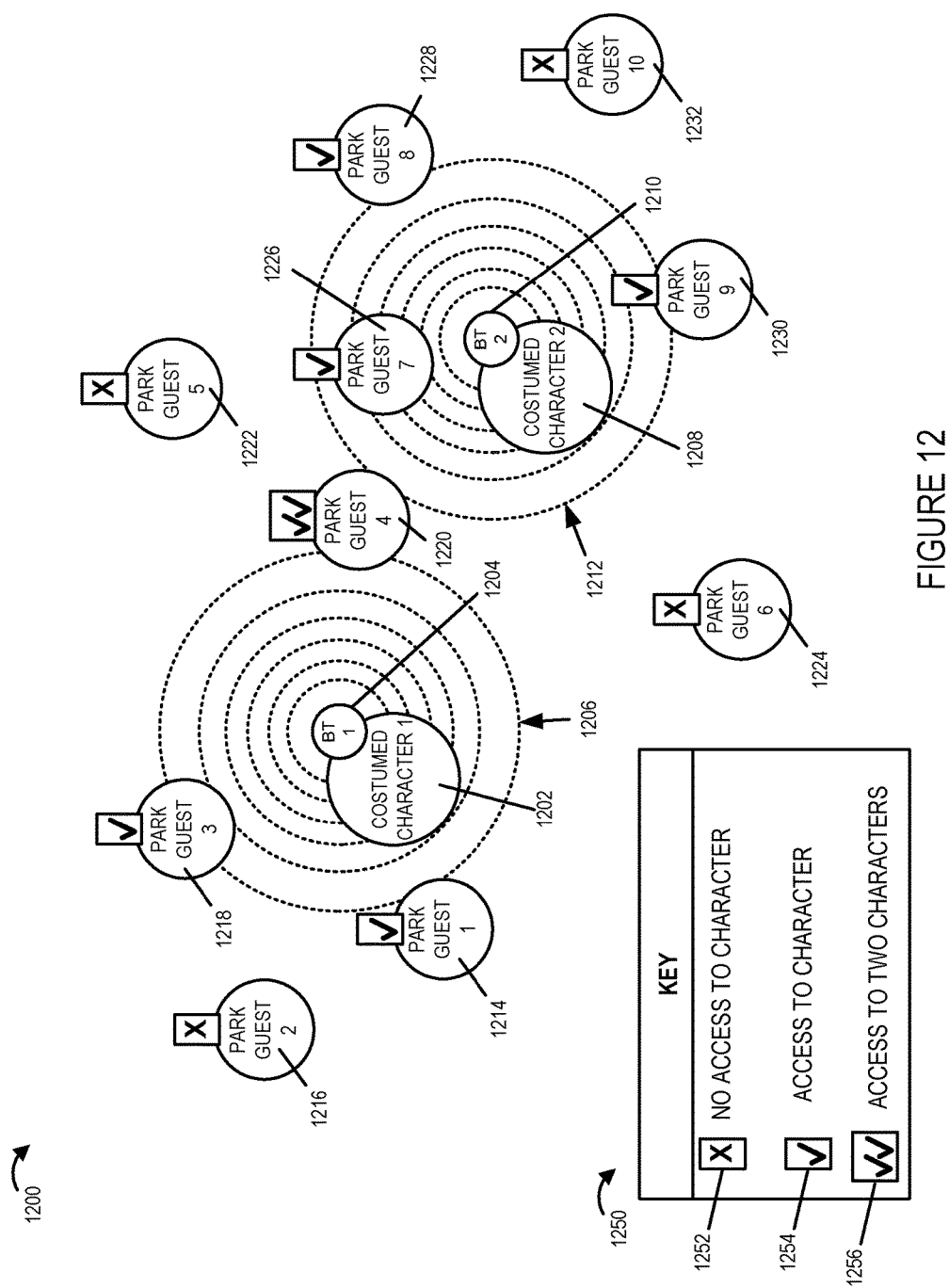
FIG. 12 is a drawing illustrating exemplary costumed characters, each costumed character having a beacon transmitter with a corresponding coverage area, exemplary park guests, each park guest having a user device which monitors for and detects beacon signals and which may access content or product related to a costumed character when the user device is within the beacon range of the costumed character, in accordance with an exemplary embodiment.
Figure 13:
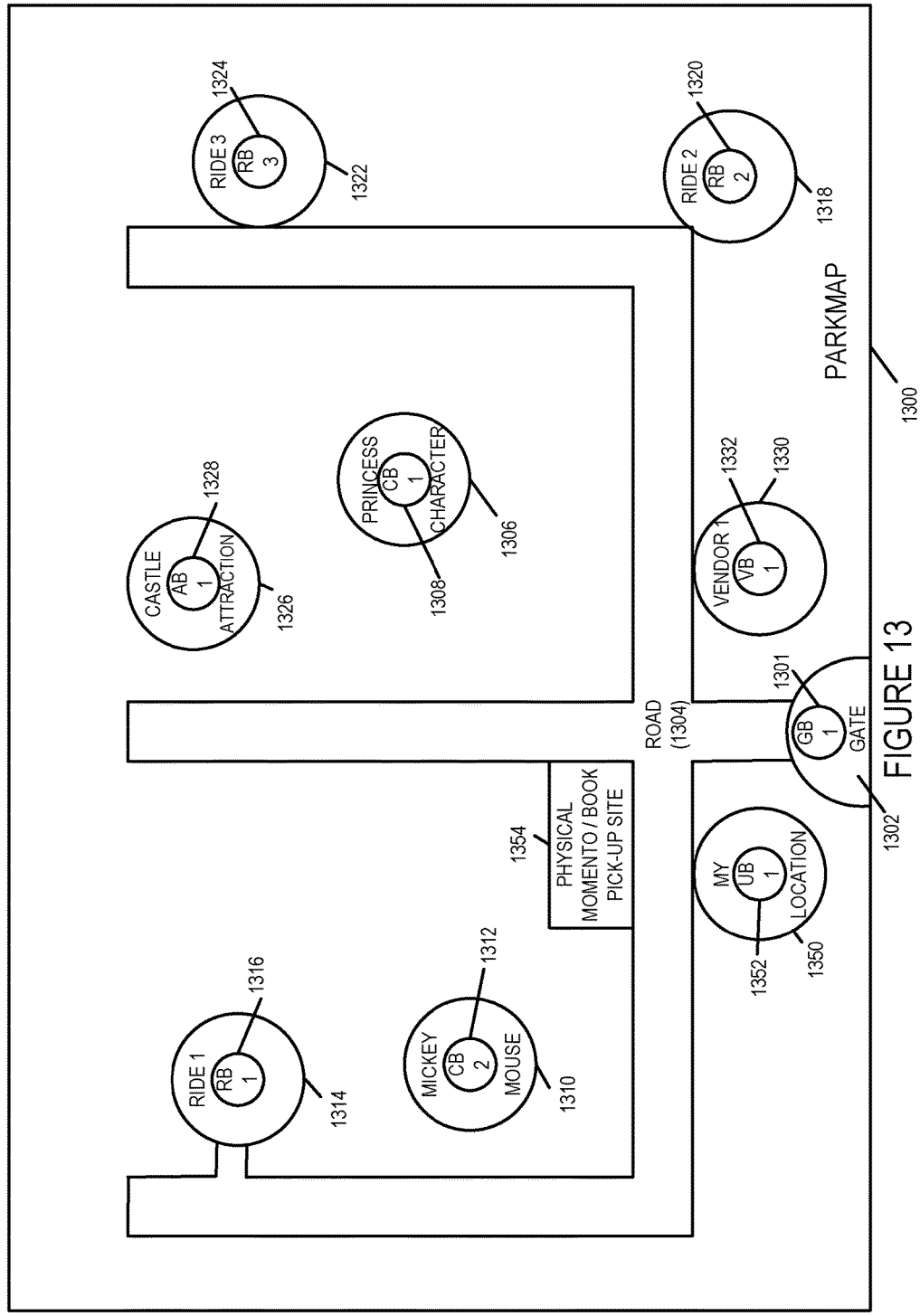
FIG. 13 is a drawing illustrating an exemplary park map including exemplary items including a gate, a costumed character, an attraction, a ride and a vendor cart, with each item including a beacon transmitter, and an exemplary visitor including a user device including a beacon transmitter, in accordance with an exemplary embodiment.

FIGS. 12 to 14 correspond to an example where beacon signals are used to enhance a visit to a site, e.g., theme park, zoo, historical cite or other location. Various features are directed to methods and apparatus for communicating information to a visitor of a site, e.g., a theme park, historical site, zoo, etc., providing mementos of the visit and/or communicating information encouraging future, e.g., repeat, visits are described.

In various embodiments costumed characters, vending carts and/or other items of interest may move around a site and thus be at different locations at different times of the day. In some embodiments beacon transmitters are inserted in the costumes of the characters, on the vending carts and/or on other moveable items. Each beacon transmitter transmits a unique wireless signal sometimes referred to as a beacon ID. The beacon transmitters maybe Bluetooth, WiFi or other types of transmitters such as, e.g., Eddystone and/or ibeacon transmitters. Depending on the type of beacon transmitter the range of the beacon signal may be relatively small, e.g., a matter of up to 15 feet in the case of some Bluetooth transmitters or larger in the case of WiFi or other transmitters where the range may be, e.g., 10, 30 feet or more in some cases. The range of a beacon transmitter may be from 2 to 300 meters, depending on the beacon version. This equates to a range of approximately 7 to 984 feet depending on the beacon transmitter used. The transmitters transmit a unique signal, e.g., a beacon ID, allowing the transmitter, and thus the item and/or costumed character associated with the transmitter, to be identified.

In various embodiments in addition to placing beacon transmitters on movable items, beacon transmitters are positioned at a site at the location of fixed items of interest such as landmarks, particular displays, etc.

Visitors to a site often bring cell phones and/or other wireless devices with them which are capable of receiving, and also often transmitting, beacon signals. The user devices discussed with regard to FIGS. 12-14 may be the user devices of FIG. 1 or any of the other figures while the server may be the server of FIG. 1 while the server, registry or registrar, said terms being used interchangeably sometimes, could be the server 106, the server 300 of FIG. 3A or the server shown in any of the other figures.

FIG. 12 illustrates an exemplary diagram of a theme park site 1200 with costumed characters 1202 and 1206 and a number of park guests including 10 park guests 1214, 1216, 1218, 1220, 1222, 1224, 1226, 1228, 1230, 1232 each of which carries a user device, e.g., a cell phone which can detect beacon signals and report them to the server for use in obtaining content, location tracking and/or making decisions as to what content a particular user reporting a beacon signal is allowed to collect, e.g., based on the user being in proximity to a costumed character or other item associated with a beacon transmitter. The user device and be the user device 104 of FIG. 1 or any other user device shown in the present application, The first costumed character 1202 has a first beacon transmitter BT1 1204 in the costume and thus carries BT 1 1204 around the park with him as he moves around the park. The second costumed character 1208 carries BT 2 1210 around with him, e.g., in his/her costume. The set of circles 1206 is intended to show the coverage range of BT 1 1204 and the set of circles 1212 is intended to show the coverage area of the second beacon transmitter BT 2 1210. The closer to the BT a user device carried by a park guest is to the beacon transmitter the stronger the signal will be and thus signal strength along with the detection of a signal and time of receipt can be used to facilitate location determination and tracking as well as being used with regard to controlling access to content or collectable items, e.g., character pins or photos.

The key 1250 shows which user devices, e.g., as represented by the illustrated users, will have access to character related content by viture of being within beacon transmission range of the costumed character's beacon transmitter. For example park guest 2 1216 is outside of the range of BT 1 1204 and BT 2 1210 and thus will not be allowed to access collectable character content which is restricted to be collected to periods of time in which the user is within the coverage area of a beacon signal corresponding to the character. Park guest 1 1214, and park guest 3 1218 are within the coverage area of BT 1 1204 and are allowed by the server 300 to collect, access and/or store content corresponding to costumed character 1 1202. Park guests 7 1226, 8 1228 and 9 1230 are within the coverage area of BT 2 1210 and can receive the BT 2 beacon and thus are allowed to access, collect and/or store as part of a user record collectable content, e.g., pins and/or signed photos corresponding to costumed character 2 1208 assuming their ticket or a purchase entitles them to such content when within the beacon range of costumed character 2 1208.

Since park guest 4 1220 is able to receive the beacons transmitted by both BT 1 1204 and BT2 1210, he is able to obtain and/or access collectable content or products corresponding to both costumed character 1 1202 and costumed character 2 1208 and in some embodiments by virtue of being in the range of the beacon transmitters of both characters is also allowed to collect or access joint content, e.g., an image of both costumed characters together which the user is not allowed to access unless the beacon signals of both characters are being received.

FIG. 13 illustrates an exemplary park map 1300 that may be displayed on a user device of a park visitor. The map 1300 shows various places of interest such as the locations of the entry gate 1302 including gate beacon transmitter GB 1 1301, road or path 1304, various fixed rides including ride 1 1314, ride 2 1318, ride 3 1322, and attraction 1326. Upon reaching the gate 1302 and executing the application of the present invention the user device will detect the gate beacon 1302 and report the receipt of the beacon GB 1 1301 along with the device identifier of the user device. The server 300 will know that the user device is at the park to which the map corresponds since GB 1 1301 is known to correspond to the park and will provide the map 1300 of the visited park to the user device for display.

While locations of the gate, rides and attractions may be, and often are, fixed and known, beacons are included at the various rides and/or attractions to facilitate determination of a user device's location as it navigates through the park and reports the receipt of beacon signals.

In FIG. 13, GB is used to indicate a gate beacon, RB is used to indicate a beacon transmitter on a ride, AB is used to indicate a beacon transmitter on an attraction and CB is used to indicate a beacon on a character, VB is used to indicate a beacon on a vender cart, and UB is used to indicate a beacon transmitted by a user device. The beacon transmitters on the first, second and third rides are indicated as RB 1 1316, RB 2 1320 and RB 3 1324. The first second and third rides are identified by reference numbers 1314, 1318 and 1322. In FIG. 13 the user location 1350 is shown near the gate 1302, e.g. at the start of a visit to park 1300. The characters 1306, 1310 may move throughout the park. Their location is detected by one or more base stations located in the park such as on the rides 1314, 1322, 1318 or attractions such as at castle attraction 1326 which has beacon transmitter 1328 located on it.

The user's location 1350 will be updated over time, e.g., as the user device reports new GPS coordinates or received beacon signals indicating a change to a new location. Similarly, the user device will be provided updates from the server 300 providing updates on the location of the characters 1310, 1306 and vending cart 1330 as will be discussed below. While a basic map is shown in FIG. 13 in some embodiments the user of the user device on which the map is displayed can select one of the rides, attractions or other displayed items as a destination and a path to the destination will be displayed on the device and as the user moves progress along the path will be shown in the form of an updated location of the user device on the map.

While explained in the context of an amusement park, the map may be that of a cemetery showing the location of different plots and/or of a historical site with various locations of interest being shown on the map, e.g., with a beacon transmitter on a particular fort lookout, cannon, bathrooms, etc. and potential with the location human guides, security personal or other individuals carrying or wearing beacon transmitters being illustrated.

My location 1350 is used to show the location of the user device which is displaying the map 1300 with the user beacon being represented by UB 1 1352.

In various embodiments an executable application, e.g., sometimes referred to as an app, is loaded onto the visitors wirelesses devices, e.g., by downloading the application from an Internet site or app store. When executed the app detects wireless beacons, reports them back to a registry service along with information identifying the device which received the signal and when it was received. The registry service uses the reported beacon signals to retrieve information stored in a record associated with the received beacon ID that was reported. The decision as to what content is provided to the device reporting the receipt of the beacon signal is made based on the user's right to content as may be determined based on the purchase of a particular ticket to enter the site, e.g., theme park, the purchase of a particular package such as a signed picture book package and/or on other conditions such as proximity to a particular beacon transmitter from which a beacon signal was received which may be, and sometimes is, inferred from reported signal strength.

In the case of a funeral example the beacon is put on the deceased person, e.g., on the casket or urn in which the deceased person is located, and the beacon may travel with the person's remains from funeral hall to the grave. A user of a cell phone or other device that can detect the beacon can query the registry service with the beacon id and receive images, memorial testimony and/or other comments posted by the family or others to the registry service which stores and provides content in response to reports of a received beacon signal. Once at the grave the beacon can be used to facilitate locating of the grave in addition to being used to give direction to the graveyard. Once at the grave when the phone detects the beacon on the grave the user can view and generate content that is associated with the person in the grave. The service would be sold to by the funeral halls and cemeteries For purposes of explaining the invention an example of the theme park visit will be discussed. However the methods and apparatus are applicable to a wide range of applications and site visits and is not to be limited to a theme park visit. In fact the methods and apparatus can be used for almost any time of event from a zoo visit, a visit to a historical site, a visit to a wedding site and/or reception, a party site and even a cemetery or funeral site where beacon transmitters can be and sometimes are placed on one or more fixed or moveable items of interest. Thus the methods can be used for communicating information which maybe location dependent and/or dependent on coming into the proximity of an item or person with a beacon transmitter. The methods and apparatus can be used for storing and/or providing information corresponding to an event or encounter and documenting the event or encounter in a way that a user can later retrieve images and/or information about the event or site visit, e.g., wedding photos, character photos, information about a deceased love one whose funeral was attended and/or cemetery site was visited. Time information can be stored with images or other content corresponding to a visit to a site or other event allowing the user not only to store or access visual mementoes, e.g., photos, but also be able to be reminded about when the visit occurred.

Returning to an example where an individual with a wireless device visiting a theme park, while visiting the site of the theme park the user's location can be determined from beacon signals that are reported as having been received by the user's wireless device and/or signals transmitted by the user's wireless device and received by one or more base stations, e.g., at known locations in the visited site, e.g., ride locations, attraction locations, etc.

Thus the location of a visitor can be, and sometimes is, determined, e.g., in the user device 400 or at the server 300, based on received beacon signals, e.g., transmitted from beacon transmitters at known locations at the visited site, e.g., theme park, and/or the detection of signals transmitted by the visitors wireless signals by one or more access points or base stations in the park. Thus the visitor's location as the user moves through the site can be determined and tracked over time. The visitor's location can be, and sometimes is, determined by the user device 400 based on received GPS signals and reported to the server 300 which can use the GPS location information to determine where the user is at the visited site. In addition since the user's wireless device reports the receipt of beacon signals from beacon transmitters the user's proximity to a costumed character or characters carrying a beacon transmitter or a fixed beacon transmitter can be determined and appropriate actions taken, e.g., content and/or items to which the user is entitled can be provided or made available to the user for pickup. Tracking of users or visitors using GPS is also supported with the user devices reporting their location information, as determined using a GPS receiver, to the registry server in some embodiments. GPS location reporting may be in addition to location determinations made based on report beacon signals received by the user device and/or base stations at the visited site. In some embodiments a user can capture content, e.g. retrieve from a server or unlock previously stored content, associated with a costumed character when the user's mobile device detects the costumed character's beacon and the user initiates an action on the user's mobile device, e.g., selects an icon or entry corresponding to the detected character beacon, to capture the content corresponding to the costumed character.

In some embodiments the content and/or items to be provided include images, e.g., sometimes referred to as pins, signed photos of characters such as Mickey or Minnie, and/or actual physical items such as a Mickey mouse doll or character book including signed photos of the characters encountered during the visit to the theme park. In some embodiments this also includes the unlocking of "exclusive" items that only would be available when you collect two or more character pins at one time, or even perhaps specific characters at a designated location. This may even be used to drive crowd flow, in the sense that visitors may rush to a certain area to obtain the pin to unlock the exclusive item or content. Thus by indicating the availability to capture special content corresponding to particular characters when they are together and indicating their location together on the electronic map displayed to the users. crowd flow and be directed in a subtle way that rewards the movement of individuals towards a particular location.

While in some embodiments a printed photo book is provided as the user leaves the park, in other embodiments the photo book memorializing the visit is made available in electronic form while the user, e.g., visitor is at the park or after the visitor leaves the park. Some of the content which can be included in the photo book or in the user's record maintained by the registry service by selecting it while in the presence of a particular character beacon signal can be of a collectable nature, e.g., a special limited edition photo, and only available for a limited time Since the location of the visitor can be determined from the beacon signals which are reported as being received or through other ways, a map of the site, e.g., theme park can be updated to indicate the user's location at any given time facilitating the user's navigation through the park. In a similar manner the location of costumed characters, vender carts and/or other moveable items with which a beacon transmitter is associated can be determined and the electronic map provided to the users device updated to reflect the positions of such characters and/or items. While the costumed character locations may be indicated on the map in some embodiments content and/or items corresponding to the costumed characters can only be retrieved or unlocked, e.g., collected, while within the beacon transmitter coverage area of the beacon on the costumed character. In this way visitors can easily find particular costumed characters even though the characters may wonder freely through the theme park without being limited to a particular scheduled location.

The method of the invention can, and sometimes are, also control the crowd flow if there are one or more of same costumed characters. By indicating a selected costumed character that is closest to the visitor or one that is in less crowded part of the park the invention could move the flow of people into a less crowded section of the park. In some embodiments when there are multiple characters with the same costume only one character of a particular type is shown to any given user with different user's being shown different locations for say a Mickey character when two such characters exit in the park. This approach allows multiple costumed characters to exit at the same time but avoids parents having to explain how there could be multiple "Mickey" characters at the same time with the young child being left to potentially wonder if they were going to see the real "Mickey". In some embodiments a recommendation function is also supported by the application on the UE device with the function recommending the next costumed character for the visitor to go after next, e.g., based on proximity to the user and/or the crowd or wait time associated with meeting a character. The recommendation is based in some embodiments on what content was already captured and a visitor's indication of which content, e.g., character signatures, the visitor is desiring to capture. The invention on the mobile device would need to add the ability to capture the interest of the visitor.

Visitors can select, e.g., tap on an item or character displayed on the electronic map and a suggested route of travel indicated to the user with the user's progress along the map being shown as the user moves along the route. As the location of a movable target destination, e.g., current character location changes, the suggested route will be automatically updated as well as the indicated location of the user selected target destination.

While the methods and apparatus facilitate travel and finding of items of interest at a visited site, the user can also retrieve information and/or content about item associated with a beacon transmitter, and/or associate content captured by the user with the time for future retrieval. In this application a costumed character may be considered an "item" with which a beacon transmitter is associated. Thus costumed characters, like vending carts are to be considered "items" for purposes of discussing the invention.

In some embodiments when the user device, e.g., cell phone, comes into proximity of a beacon transmitter, receipt of the beacon is detected and information or content, e.g., an icon, associated with the beacon is displayed to the user. The icon may be, and sometimes is, supplied by the register service to which the receipt of a beacon signal is reported. The icon, including information and/or content might be an image, a set of words or a combination of an image and words associated with the detected beacon signal corresponding to a particular item. For example when a beacon carried by a Mickey mouse character is detected, the user's wireless device may show a gray or shaded Mickey mouse character which the user can select by tapping on a touch sensitive screen, e.g., of a cell phone on which the character is displayed. Selection of the icon corresponding to a beacon signal is reported to the register service and the user is allowed, depending on the ticket or plan purchased by the user, access to content and/or mementos related to the selected icon.

For example if a user device corresponding a basic admission ticket selects a Mickey icon displayed in response to detecting a "Mickey Mouse" character beacon signal the user may be provided, free of additional charge, with a small image, sometimes referred to as a "pin", of Mickey on their wireless device. The user may be, and sometimes is, also provided the opportunity to order additional "Mickey" merchandise or upgrade for a fee to a more substantial memento such as a signed photo of Mickey. The signed photo can be, and is, in some embodiments, customized with comments or wishes to the user and may include the user's name which can be obtained from a user record associated with the wireless device. If the user has purchased a memento book or purchased more than a basic subscription the user may be automatically provided with the signed photo in electronic form on their wireless device of the photo can be made available to the user in the form of a printed memento book which can be picked up on when leaving the theme park or mailed to the user.

The user record is updated to reflect entitlement to the image or images to which the user is entitled based on achieving proximity to the costumed character combined with the fact that a particular level ticket or product was purchased.

In this manner a visitor can collect images and/or signed photos of characters with which they come into proximity without having to wait in lines or make physical content with the costumed character.

Since the customer record is updated to reflect characters and/or items of interest that a customer encounters as they move through a theme park a sequential record of the characters they encounter can be stored and the photos of the characters presented in the order they are encountered in the customized electronic or printed memento book. In addition to providing images of characters, items of sites within the theme park visited by the user, a user can capture an image while at the park and associated it with a character, site and/or item by selecting the icon of the character, site or item and uploading a captured photo to the register server along with an indication of the associated icon and the identifier of the device or user uploading the image.

The register can incorporate the image or images captured by the user into the photo collection created by selecting icons of encountered characters. Thus not only can the user receive previously created images or photos of characters they encounter, but they can also associate there own images and/or photos of with a particular character, scene, or item. Thus a parent may snap a photo of a child with Mickey, upload it with an indication that it is to be associated with the Mickey icon and then be able to later access both the images of Mickey provided by the theme park along with their personal captured images which were captured while in proximity, of the Mickey character.

Different content may be provided when a user's device indicates it is in proximity to beacons corresponding to multiple different items than when in proximity to a single item. For example, a picture of Mickey and Minnie may be provided instead of two separate pictures when Mickey and Minnie character related beacons are both reported indicating that the two characters were in proximity to one another when the user selected the displayed Mickey and Minnie icons to show interest in the detected presence of both characters.

Using the described methods and apparatus a user can collect images and photos of the costumed characters as the user travels through the theme park, making the experience one of collecting mementos which can later be reviewed as part of a collection. e.g. in a printed book or by accessing the collection over the Internet. The images and/or collection can have content unique to a particular year or visit. In the event the user returns to the park during a later visit they can add to the previous collection and, in at least some embodiments, obtain new content corresponding to the time period of the second visit. During different years, different characters may be present at the park and/or different images provided so that the user can not only get a sense of the time frame they visited the park, but also be encouraged to revisit the park to collect new content.

In some embodiments, the mementos are accessible to the user from his wireless device or another device after leaving the park. The content can remain accessible for many years with, in some cases the user being provided with information about new attractions, promotional offers and/or reasons to revisit the park when the user accesses the content over the Internet.

Thus not only do the methods and apparatus facilitate an enjoyable experience at a park or other site visit, allow for the collection of mementos, but also they can be used to encourage and/or spark future visits days or years later as the user seeks to access the content collected electronically during a past visit.

The user device implemented method of FIG. 14, which comprises the combination of FIGS. 14A, 14B, 14C and 14D will now be discussed. The method 1400 shown in FIG. 14 can be implemented by the user device 400 or any of the other user devices in the system.

The method 1400 starts in step 1402, e.g., with the user of a user device causing the application of the present invention which uses beacon signaling to begin executing on the user's device. The user's device is identified by a device identifier and is known to the server 300 allowing a user record corresponding to the user device to be accessed. The user may have to enter a password or other security code to execute the application and/or the server may prompt the user for such a password and check it against one stored in a user record corresponding to the user device running the application. Thus when reporting beacon signals and/or attempting to access content corresponding to the user of record of the device some form of authentication may and normally will have been completed. Such authentication may occur in step 1402. As part of the authentication process a secure key or other security may be established so that subsequent communications between the user device and server 300 can be implemented in a secure manner thereby preventing other devices from obtaining easy access to the content collected by a specific user device.

Operation proceeds from start step 1406 to monitor step 1406 as well as determine location step 1404 and download and display map of park step 1402. While the download and display map of park step 1402 is shown preceding monitor for beacons step 1406, the initial map download and display 1402 may be performed in response to receiving and reporting a beacon from the visited site, e.g., a gate beacon GB 1, or after the GPS determined location is reported to the server in step 1408 informing the server 300 of which park or site a map is to be supplied for to the user device 400. Accordingly the order of the illustrated steps is exemplary and not binding or critical.

Figures 3, 3A, 3B:
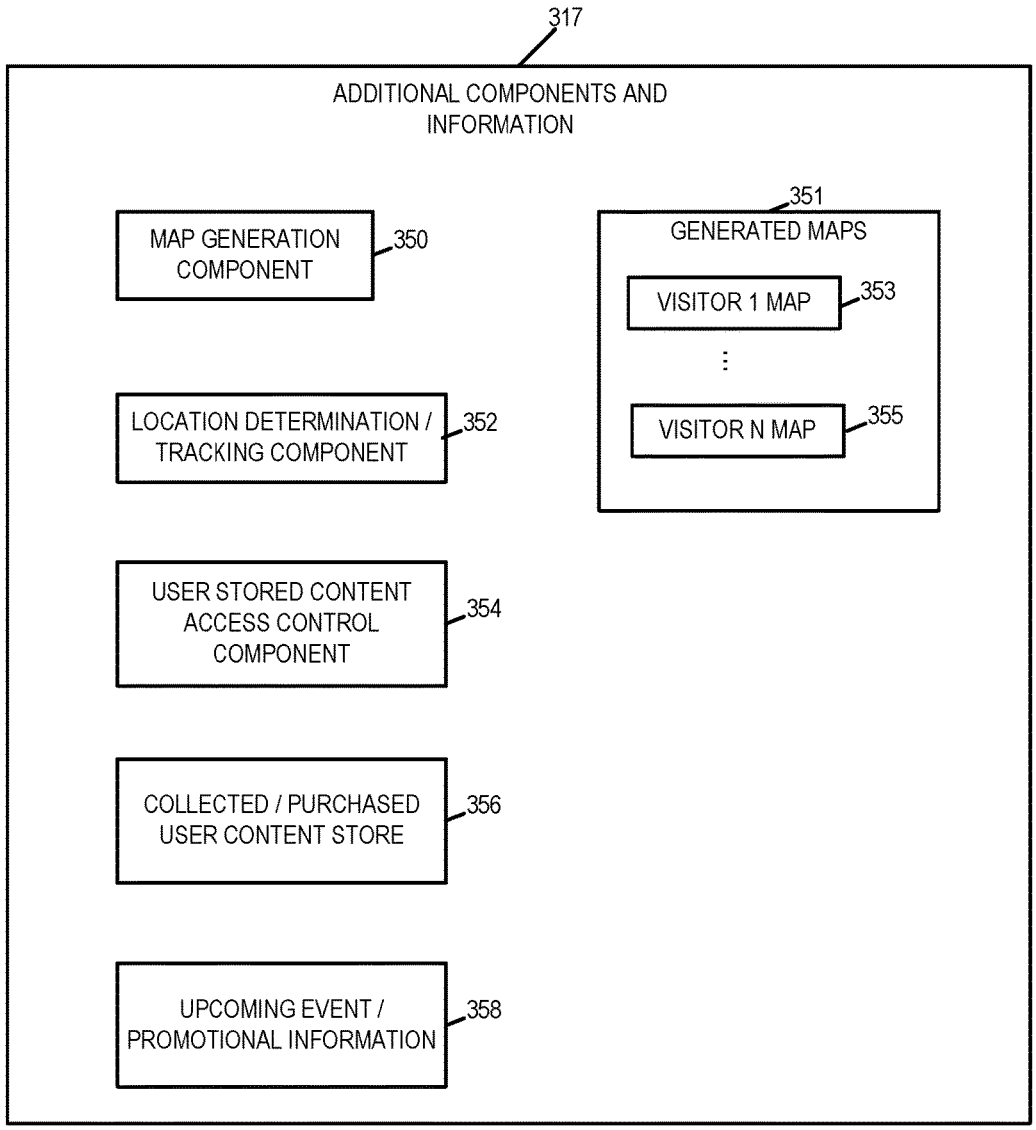
FIG. 3B is a drawing of exemplary additional components and information which may be included in the server of FIG. 3A in accordance with an exemplary embodiment.
FIG. 3 comprises the combination of FIG. 3A and FIG. 3B.

From start step 1402 operation proceeds to determine location based on received GPS signals step 1404. In step 1404 the user device 400 determines its location based on received GPS signals and then reports that information to the server 300 in step 1408 to facilitate location tracking. The server 300 operates as a registry device storing information associated with beacons, providing such information, providing map information, tracking locations of user devices and costumed characters and other beacon equipped devices and, in addition, storing customer records including collected content and potentially providing access to such content, e.g., via the Internet after, e.g., days or even years after, a user leaves the visited site, e.g., theme park. To facilitate such operations the server 300 includes various components and information, e.g., 317 as shown in FIG. 3A and which are shown in greater detail in FIG. 3B with the combination of FIGS. 3A and 3B comprising FIG. 3. As shown in FIG. 3B the server 300 includes a map generation component 350, a location determination and/or tracking component 352, a user stored content access control component 354, a collected and/or purchased user content store 356, and upcoming event/promotional information 358. Components and information 317 further includes generated maps 351 including generated maps corresponding to different visitors (visitor 1 map 353, . . . , visitor N map 355). The server 300 generates and stores customized maps 353, 355 for each individual user, e.g., park visitor. The map for an individual visitor 353 is stored and updated as new location or attraction information becomes available. By maintaining different maps for different customers consistency can be maintained over time with the particular instance of a costumed character being consistently shown and updated on the individual visitor's map with another visitor being shown, in some cases, a different location for a different instance of the same character, e.g., when there are two Mickeys at different locations. The components can be implemented as modules. The modules may be and sometimes implemented in hardware. In other embodiments the modules are implemented in software. Thus while shown in memory the components maybe hardware components, e.g., circuits, which are not part of regular memory in some embodiments.

The location determination and/or tracking component 352 determines the location of one or more items, e.g., a user device reporting receipt of beacon signals, costumed character, vending cart based on reported received beacon signals whether they were reported as being received by the device whose location is being determined or other devices, e.g., base stations, at fixed locations in the park. Alternatively or in addition to beacon based location determination techniques the component 352 can determine the location of items based on their reported locations which they determined based on received GPS signals and/or other received signals. The location determination and tracking component updates location information for each item it tracks as new locations are determined. Thus the location of a user device will be updates as a user device moves through the park and reports a new GPS based location or reports the receipt of beacon signals indicating movement to a new location. Similarly the location of costumed characters and vending carts is tracked and updated by component 352. The tracking component 352 provides current location information to map generation component 350 which generates and sends maps to various different devices, e.g., different UE devices. While multiple costumed characters wearing the same costume may be present in the park, e.g., at locations not directly visible from the location of the site where the similarly dressed character is located, in some embodiments the map generation component 350 shows on the map generated for a specific UE device only one instance of each particular character. The location of that particular instance of a character is tracked and shown on one user device while another instance of the same character is tracked and shown on another user's device. Thus in at least some embodiments different costumed character instances are shown and tracked on maps provided to different user devices. By providing information about different character instances or showing different customers different routes on the map, the map generation component can steer different customers to different areas of the park and thus control or facilitate the flow of visitors to the park.

The map generation component 350 generates and controls the transmitter of the server to communicate the map generated for a UE based on the location information determined by component 352 to the UE device for which the map was generated. The server 300 also includes a store of user collected/purchased content 356. The content store 356 can include a record for each user and include the pins, signed photos, purchased content and/or videos for each individual user of the system. The stored content can include images captured by the user and uploaded to be included with the collected content as well as content obtained while within beacon range of a costumed character and selected to be collected by the user of the user device to which the content record corresponds. User stored content control component 354 is used to implement user login procedures and restrict a user's access to content which was stored in the user's collection, e.g., individual user's storage record, in store 356. A user can access collected content in store 356 via the Internet through user stored access control component 354. Since a user logs in via this component the component 354 can identify the user accessing their stored content and select upcoming event and/or other promotion information from the stored information 358 which will be supplied and present to the user as they access there collected content included in content store 356. Thus component 354 can not only control access to collected or purchased content so it is not supplied to the wrong entity it can and sometimes does use targeting information to selected promotion material to present to the entity to encourage future site, e.g., park, visits.

A map in generated maps 351 can be stored prior to transmission to an individual customer and/or for updating purposes so that changes to the map supplied to an individual user device is updated over time as items move in the park with different customers receiving different customized maps with suggested routes and/or showing different character locations for the same character, e.g., Mickey character.

Having discussed some of the server/register device features that make the communications and route providing features possible, we will return to the discussion of the user device method flow shown in FIG. 14.

Having discussed how the user device 400 may, and sometimes does, report its GPS determined location in step 1408 to the server 300 and report changes to the location over time, other portions of the method shown in FIG. 14 will now be discussed. After start of operation in step 1406, the user device monitors for beacon signals, e.g., signals transmitted by the beacon transmitters of costumed characters, rides, attractions, etc. In step 1410 one or more beacon signals are detected. Then, in step 1412 the user device 400 reports received beacon(s) to the registry device, e.g., server 300, e.g., with information identifying the user device and time of detection(s). Then in step 1414 the user device 400 receives information and/or content from the server 300 corresponding to one or a set of the reported beacons. The information may be text, an image or an icon associated with a character from which a beacon signal was received, information about a ride or other attraction from which a beacon was received or information which the server 300 determines based on one or more rules should be provided when a particular predetermined combination of beacon signals is reported as being received. For example when beacon signals from two costumed characters are reported as being received at the same time, the server 300 may and, in some embodiments, will provide different content, e.g., joint character content showing the characters together, as opposed to when an individual beacon signal is reported as being received. Operation proceeds from step 1414 to step 1416. In step 1416 the user device 400 displays at least some information, e.g., an icon on the display of device 400, e.g., on a map or a list of detected items, e.g., a list of detected characters, rides, and vendor carts.

Figure 14A:
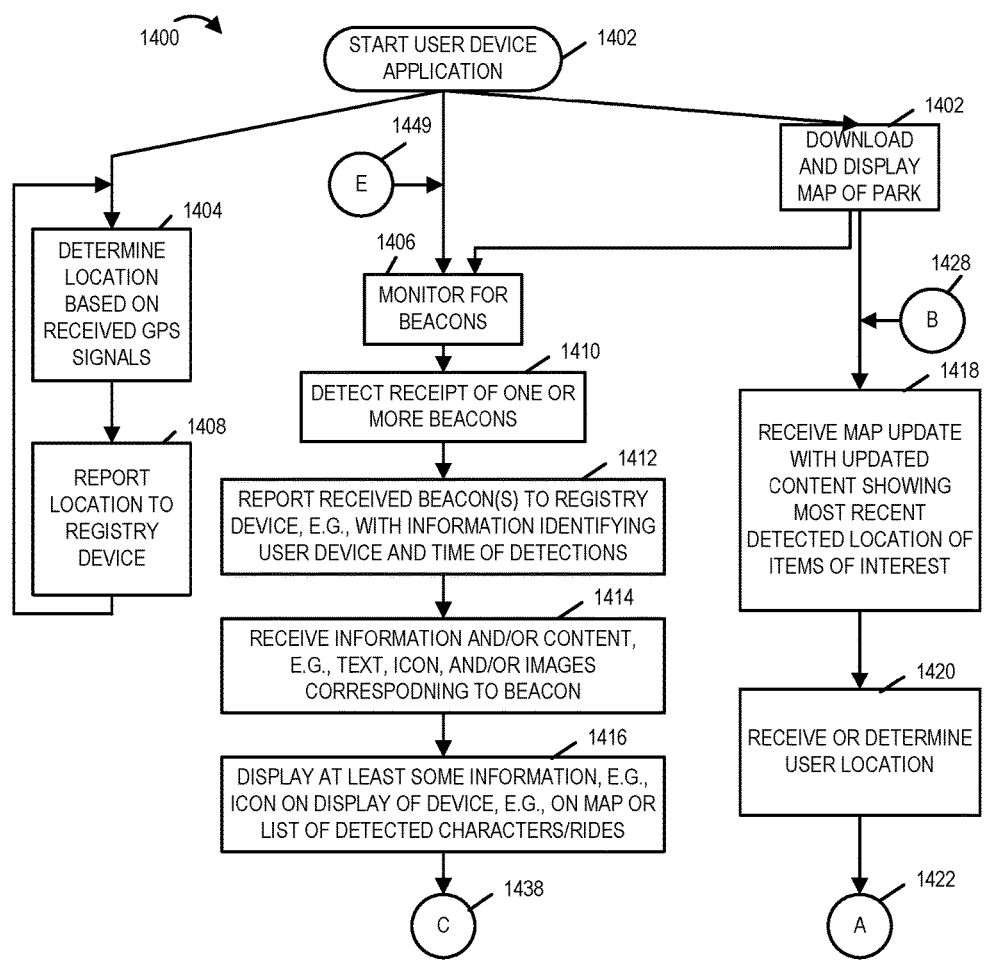
FIG. 14A is a first part of a flowchart of an exemplary method of operating a user device in accordance with an exemplary embodiment.
Figure 14B:
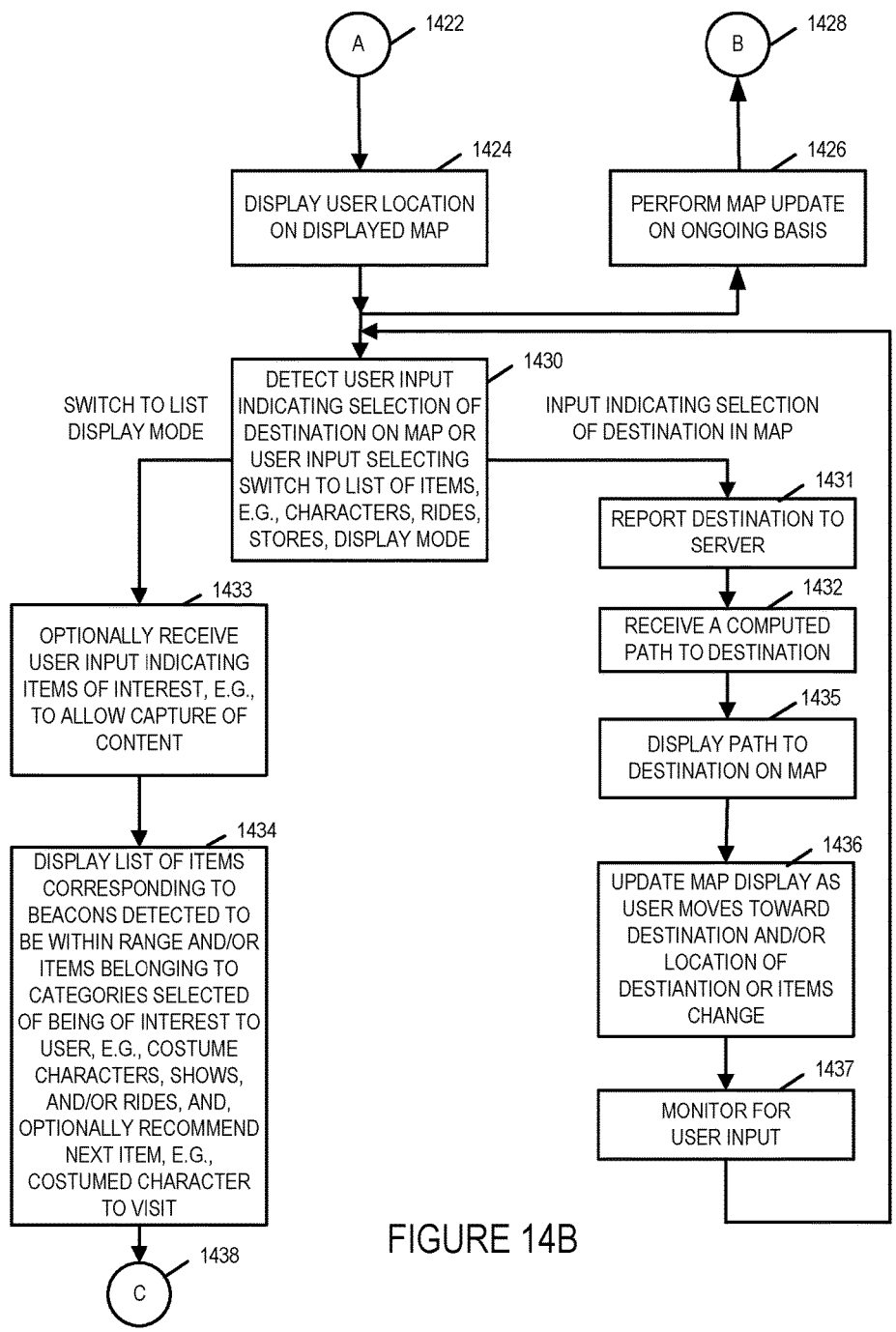
FIG. 14B is a second part of a flowchart of an exemplary method of operating a user device in accordance with an exemplary embodiment.
Figure 14C:
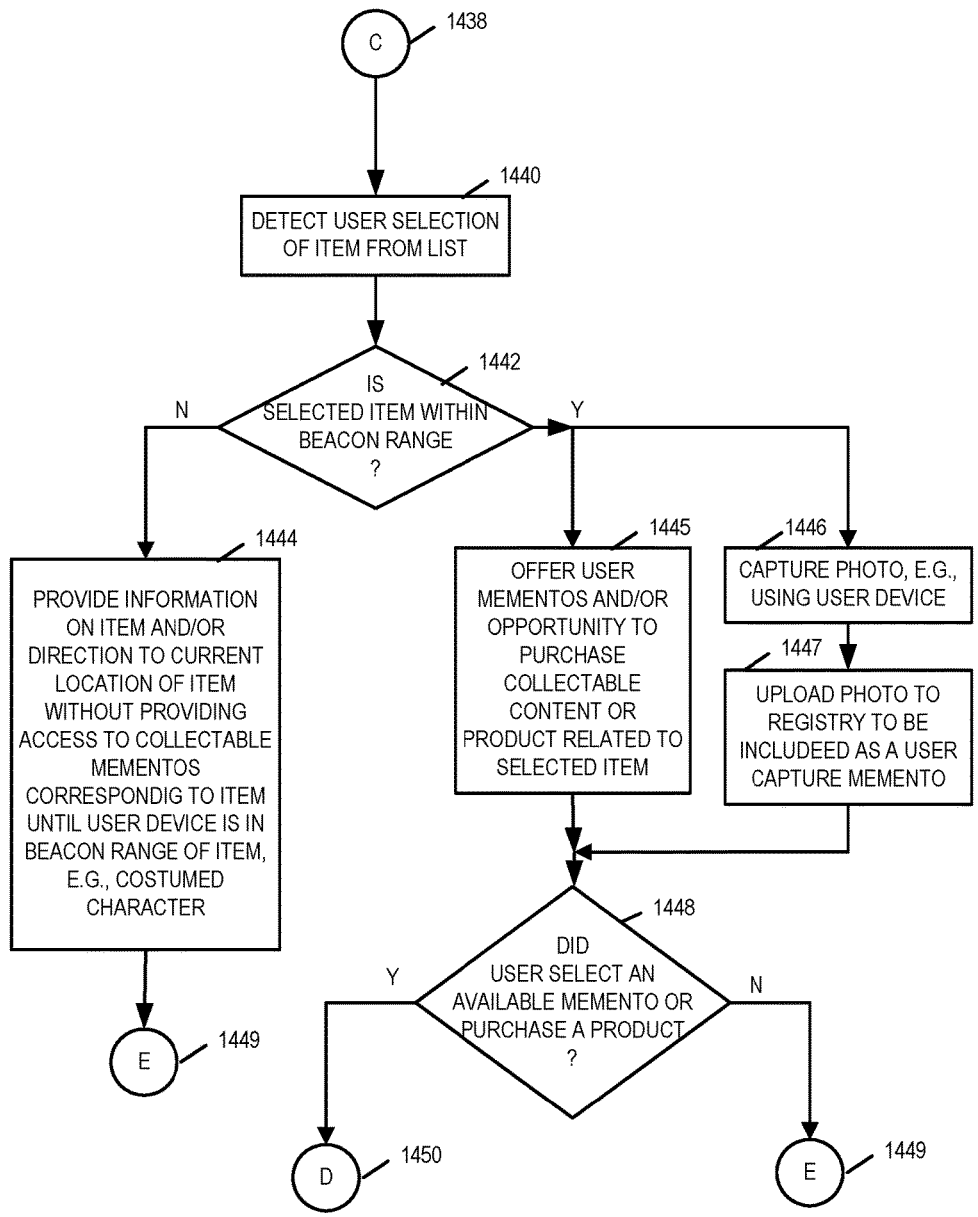
FIG. 14C is a third part of a flowchart of an exemplary method of operating a user device in accordance with an exemplary embodiment.

Operation proceeds from step 1416 to step 1440 shown in FIG. 14C via connecting node C 1438. Steps 1406 through 1416 may be relatively transparent to a user of the device since they do not involve or require user input and maybe performed at the same time various content or maps are displayed to a user.

Accordingly it should be appropriate that the various map display and user input steps shown on the right side of FIG. 14A can be performed in parallel with at least steps 1406 though 1416.

After the display of the initially downloaded map if the site, e.g., theme park, in step 1402, operation proceeds to step 1418 wherein a map update is received with updated content showing the most recent detected location of various items at the park, e.g., at least some of which maybe were indicated to be of interest to the user of the device 400. For example if a customer indicated Mickey was of interest, the location of a first instance of the Mickey character would be displayed on the user's map and the location of that particular first Mickey costumed character would be updated as the character moves. Other user devices might show a different instance of the Mickey character and the movement of the other Mickey or Mickey characters would not result in a change in the location of the first Mickey shown on the user's device. The vending carts displayed on customer devices might all be the same with the updates with regard to vending cart locations being sent to all UE devices.

While map updates indicating the location of movable items such as costumed characters are received in step 1418 in step 1420 the user device 400 has its own location updated either by the user device determining a new location based on received beacon signals or because the server 300 indicates to the UE that it has determined that the UE is at a new location, e.g., based on one or more reported beacon signals that were received by the UE. Map and/or location updates can be provided as incremental updates to the UE or in the form of a replacement map to be used by the UE with the new locations of items and the UE being shown on the replacement map. With various locations having been updated in steps 1418 and step 1420, operation proceeds via connecting node A 1422 to step 1424.

In step 1424 the user location is displayed on a map on the display of the user device 400. The displayed map is the map that was updated to reflect the most recently indicated locations of various items including costumed characters and/or vending carts.

Operation proceeds to from step 1424 to steps 1426 and 1430. Step 1426 is a map update repeat operation that may be performed periodically, e.g., by the user device requesting a map update from the server 300 at periodic or other intervals. Operation is shown proceeding from step 1426 via connecting node B 1428 to steps 1418 and 1420 to show that these updates will be performed repeatedly while a user is at the site and may move through the site.

While a map of the visited site, e.g., park, is displayed, the user device monitors for user input. Step 1430 shows the detection of user input by the user device 400 where the detected input indicates selection of a destination on the displayed map or that the user wants to switch to displaying a list of items, e.g., characters, rides, stores, etc., display mode of operation instead of the map display mode of operation.

If in step 1430 user input selecting a destination on the map is detected, e.g., the user touching a displayed ride, costumed character, vending cart, etc. is detected, operation proceeds from step 1430 to step 1431. In step 1431 the user device reports the intended destination to the server 300 which can use the information to compute a path and/or keep track of the number of visitors headed in a particular direction or to a particular costumed character. In some embodiments the server 300 keeps track of the number of users who have selected a particular costumed character as a destination and may and sometimes does also calculate an estimated arrival time. To avoid crowds the server may avoid showing the instance of the character, to whom large numbers of visitors are heading, to new visitors of the park and may instead deploy another instance of the character to another location in the park and/or show the other instance of the same character on the map of new park visitors.

In step 1432 the user device 400 either computes a path to the user selected destination or receives path information from the server 300. Operation then proceeds to step 1433.

In embodiments where the server 300 computes the path the server may take into consideration the location of other users between the current location of the device and the selected destination and use that information to select a path intended to avoid congestion and/or cause the user to pass by shops or carts the user may consider of interest and make a purchase from. Thus the server 300 based path update approach facilitates congestion avoidance and can also be used to promote sales from carts that maybe placed at locations between the user and destination. The path received in step 1432 is computed by the server in some embodiment taking into consideration the location of user devices and/or their destination.

In step 1435 a path to the destination is displayed on the map which is being displayed. In some embodiments the user device computes the path. Once a path has been computed and displayed, it may need to be updated to reflect determined or received reports of changes in item location. For example as the user device 400 becomes aware of changes in the location of a destination item or changes in the user device in step 1436 the displayed map including the path to the user selected destination will be updated to reflect the new location or locations of the displayed item or items as well as the location of the user device 400 as it moves along the path or another path.

While the map to the destination is displayed monitoring for user input will be performed in step 1437 and operation will proceed to step 1430 when input is detected so that the user input can be considered and used to determine the next processing path onto which operation should proceed.

If in step 1430 the receipt of user input indicating a switch to a list display mode of operation has been received, e.g., detected, operation proceeds from step 1430 to step 1433. In step 1433 additional input may be, and sometimes is, received. For example user input indicating items of interest, e.g., a list of specific costumed characters, the visitor would like to meet is received. Step 1433 is optional and may be skipped. Operation proceeds from step 1433 to step 1434 if step 1433 is skipped or where step 1433 is not skipped from step 1433 to step 1434.

In step 1434 a list of items corresponding to beacons detected to be within range and/or items belonging to categories selected of being of interest to the user, e.g., costume characters, shows and/or rides and optionally a recommended next item, e.g., costumed character to visit to obtain collectable content may be, and sometimes are, displayed. Normally information corresponding to detected beacons which are nearby will be displayed while items outside of beacon range may not be displayed unless indicated to be of interest to the user by category type or a particular explicit user selection of an item, e.g., character, the user is interested in.

Operation proceeds from step 1434 to step 1440 via connecting node C 1438. In step 1440 a user detects an item from the displayed list, e.g., the device 400 detects the user touching a displayed item on the list. Operation proceeds from step 1440 to step 1442. In step 1442 a determination is made as to whether the user selected item in the list corresponds to a beacon that the user device 400 is within range, e.g., can receive, or is outside the range of the beacon signal corresponding to the selected item. This check is made because visitors are allowed to obtain collectable content corresponding to an item when they are with the beacon signal range of the item but not at other times. For example if a user selects a costumed character from the list of displayed items which is displayed because the user indicated in interest in the character, the user will be required to get within beacon range of the selected costume character before they can download or unlock collectable content corresponding to the character. Items corresponding to beacons which are within range may include some indication that the corresponding item is within range, e.g., the items may be displayed using bold while items that are listed that corresponds to beacons which are out of range maybe shown in gray or some other visual indication may be used. For example an asterisk may be displayed with a listed item out of range while items within beacon range may not include the asterisk.

In step 1442 if it is determined that the selected item is not within beacon range of the user device, e.g., the user device can not receive the beacon signal transmitted from the selected costume character, operation proceeds from step 1442 to step 1444. In step 1444 the user is provided with additional information on the user selected item from the list and/or directions to the current location of the item from the known location of the user device. The information provided in step 1444 is provided without providing access to collectable mementos corresponding to the selected item until the user device comes into beacon range of the beacon transmitter associated with the user selected item, e.g., within range of the beacon transmitter included in the costume of the user selected item. Operation proceeds from step 1444 to step 1406 via connecting node E 1449 so that the device will continue to monitor and respond to the receipt of beacon signals as the user device and/or items in the park move.

In step 1442 if it is determined that the user device is within beacon range of a user selected item, operation proceeds to steps 1445 and steps 1446, with one or both of these steps being performed.

In step 1445 the user is offered mementos and/or an opportunity to purchase collectable content or products related to the selected item whose beacon signal the user device can receive. In step 1446 the user or someone using the user's user device 400 can capture a photo to be associated with the user selected item. For example a photo of a child can be captured with the costume character using a camera included in the user's user device 400. Then in step 1447 the captured photo or photos are uploaded to the registry device, e.g., server 300 to be stored and used as a visitor captured memento. The uploaded photo is stored in a collected set of images associated with user of the customer device and can be accessed by the user after leaving the park along with other collected content such as non-user provided pins or signed photos of characters encountered at the park.

Operation proceeds from steps 1445 and 1447, when they are performed, to step 1448. In step 1448 a check is made as to whether a user selected an available memento to collect or product to purchase. If the user did not selected a memento to collect or a product to purchase operation proceeds to step 1406 via connecting node E 1449. However if a user selected an available memento or product to purchase operation proceeds via connecting node D 1450 from step 1448 to step 1452.

In step 1452 the user device downloads and/or unlocks content selected or purchased by the user as a memento. The content which is unlocked is content to which the user is entitled to receive or collect because of being in the presence of the beacon signal corresponding to the item and/or the purchase of a ticket to the park or the selected content which authorizes the user to collect, e.g., download to the user device and stored in memory and/or have the content stored in the users collection in the server or otherwise made available to the user via the server.

Then in step 1454 the memento or purchased content is displayed to the user on the display of the user device 400. Operation proceeds from step 1454 to step 1456 in which the register, e.g., server 300, is updated so that the user's record indicates collection or purchase of the collectable memento or product downloaded in step 1452. Operation proceeds from step 1456 to step 1458. In step 1458 a check is made as to whether a physical product, e.g., toy or paper copy of a book was purchased. The physical product will normally be in addition to corresponding electronic content which may be an electronic version of the book that was purchased and downloaded. If a physical product was purchased, in step 1460 the physical product is made available for pickup, e.g. at a pickup counter near the park gate, and/or is automatically shipped to the visitors home.

Operation proceeds from step 1460 to step 1462 or directly from 1458 to step 1462 if a physical product was not purchased. In step 1462 a record corresponding to the user indicating the purchased and/or collected content and mementos is stored in the server so that the content, e.g., video and/or audio content, and mementos can be made available to the user when he accesses the server 300 at a later time. Operation proceeds from step 1462 to step 1464. In step 1464 the user device receives input from a user, at a time after leaving the visited site, e.g., park, initiating access of the content that was purchased and/or collected. For example the user may use his user device 400, e.g., cell phone, to log into the server 300 and retrieve or view the mementos collected during the visit to the park. In step 1466 the user device 400 accesses, e.g., over the Internet, collected and/or purchased content and/or photos stored at the server or made available to the user by the server because the user's record indicated the collection or purchase of the collectable content or mementos.

Operation proceeds from steps 1466 to steps 1468 and 1470. In step 1468 the user receives and displays the collected and/or purchased content provided by the server 300 in response to the user's accessing of the collected content and mementos. In step 1470 the user device receives and displays promotional content and/or information about upcoming events at the previously visited site, e.g., theme park. The content and/or information received and displayed in step 1470 may be obtained from the server 300 with the server providing the promotional material and/or information in conjunction with the collected and/or purchased content. Thus additional visits to the park can be encouraged while the user is viewing and remembering his/her trip to the park.

In some embodiments the server organized the collected material along with images of the rides and attractions into a story book order with the order automatically being determined by the users known path through the park and/or sequence in which the collectable content was collected as the user traveled through the park.

For example a story might automatically be generated with computer selected text based on the order what the user did at the park. An example might be for example as follows:

"We entered the park and were greeted by [computer inserts name of costumed character first encountered as indicated by detected beacon signals or first costume character image that was collected]" the text would then be followed in the story book by an image of the character that greeted the user at the park.

The story might then continue with "After meeting [computer inserts name of costumed character first encountered] we meet [insert name of second costumed character] or if a ride was taken next rather than we meet include "we took a ride on [computer insert name of attraction the user took a ride on].

The story book may continue with text and images presented in the sequence the user encountered the characters and/or took rides with collected content and images inserted in the order in which they were collected.

The custom memento book will differ from user to user depending on the order in which they encountered characters and took rides as can be determined from the beacon information and/or ride information related to the server 300.

It should be appreciated from the above that not only do the methods and apparatus facilitate the communication and documentation of a visit to a site or theme park in a fun and easy to use way they also allow a park or other site operator to direct flow of visitors and/or take other actions to help visitors move around in an efficient way. The methods and apparatus also facilitate the communication of information and/or offers which can encourage repeat visits to a site such as a theme park.

In embodiments where a character has a beacon transmitter in his or her costume and/or a ride has a beacon transmitter mounted on it or is at the site of the ride the beacon transmitter is co-located with the character or ride and can be used in determining if the user is at or near a ride or character.

Accordingly, while the methods and apparatus may facilitate the enjoy ability of a visit to a site they address communications problems related to communicating and storing information and content as a user may move through a new and unfamiliar environment where the location of items of interest may change with time.

What is claimed is:

1. A method of operating a user device at a site visited by a user, the method comprising:
   displaying to the user, on a display of a user device, a list of costumed characters, beacon transmitters being co-located with costumed characters located at said site;
   monitoring for user selection of a costumed character on the list;
   displaying to the user a map of a visited site showing a location of the user on the map and a location of a user selected costumed character, the map showing the location of a single instance of the user selected costumed character, without showing the location of other instances of the user selected costumed character, despite the visited site to which the map corresponds having multiple instances of the user selected costumed character; and
   providing the user the opportunity to obtain content corresponding to the user selected costumed character when the user is within beacon transmission range of a beacon transmitted by a beacon transmitter co-located with the single instance of the user selected costumed character.

2. The method of claim 1, wherein which instance of the user selected costumed character is displayed on said map is based on a number of visitors headed in the direction of the single instance of the user selected costumed character.

3. The method of claim 2, wherein changes in location of the displayed single instance of the user selected costumed character on the map is updated when the single instance of the costumed character shown at the location of the single instance of the costumed character moves but not when other instances of the same costumed character move.

4. The method of claim 3, further comprising:
   updating a registry device with information indicating collectable content collected by the user device while in the presence of one or more beacon signals transmitted by an item or items corresponding to the collected content.

5. The method of claim 1, further comprising:
   displaying at least some user selectable items in addition to said costumed characters, different beacon signals being associated with different user selectable items;
   monitoring for user selection of one of the displayed items; and
   providing the user the opportunity to obtain content corresponding to the user selected item if the user is within beacon transmission range of a beacon associated with the user selected item.

6. The method of claim 5, further comprising:
   receiving map update information indicating a new location on the map for the user selected item, said user selected item being a moveable item with which a beacon transmitter is co-located; and displaying updated location information for the user selected item on the display of the user device.

7. The method of claim 1, further comprising:

operating the user device to unlock content corresponding to the user selected costumed character when the user is within a beacon coverage area of the beacon transmitted by the beacon transmitter co-located with the single instance of the user selected costumed character.

8. The method of claim 1, wherein said single instance of the user selected costumed character is a costumed character which includes a beacon transmitter in a costume of the single instance of the user selected costumed character.

9. The method of claim 8, wherein the list of costumed characters include costumed characters who wander freely through the visited site without being limited to scheduled locations.

10. The method of claim 1, wherein said step of displaying to the user the map of the visited site showing the location of the user on the map and the location of the user selected costumed character includes showing the location of the single instance of the user selected costumed character that is in a less crowded part of the visited site than a closer instance of the user selected costumed character to direct the user into a section of the park that is less crowded than the portion of the park where the closer instance of the user selected costumed character is located.

\* \* \* \* \*